United States Patent
Shim et al.

(10) Patent No.: US 12,510,931 B2
(45) Date of Patent: Dec. 30, 2025

(54) ELECTRONIC DEVICE COMPRISING FLEXIBLE DISPLAY

(71) Applicant: SAMSUNG ELECTRONICS CO., LTD., Suwon-si (KR)

(72) Inventors: Seungbo Shim, Suwon-si (KR); Junghyung Kim, Suwon-si (KR); Hankon Kim, Suwon-si (KR); Daehee Park, Suwon-si (KR); Junkyu Park, Suwon-si (KR); Dongil Son, Suwon-si (KR); Jaehoon Song, Suwon-si (KR); Duhoon Jung, Suwon-si (KR); Myungkyoon Chung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 258 days.

(21) Appl. No.: 18/308,269

(22) Filed: Apr. 27, 2023

(65) Prior Publication Data

US 2023/0259169 A1    Aug. 17, 2023

Related U.S. Application Data

(63) Continuation of application No. PCT/KR2021/018110, filed on Dec. 2, 2021.

(30) Foreign Application Priority Data

Dec. 4, 2020  (KR) .................. 10-2020-0168029
Jan. 18, 2021  (KR) .................. 10-2021-0006828

(51) Int. Cl.
*G06F 1/16* (2006.01)
*G06F 21/00* (2013.01)
*G06F 21/34* (2013.01)

(52) U.S. Cl.
CPC .......... *G06F 1/1652* (2013.01); *G06F 1/1624* (2013.01); *G06F 21/34* (2013.01)

(58) Field of Classification Search
CPC ...... G06F 1/1652; G06F 1/1624; G06F 21/34; G06F 21/30; G06F 21/305; G06F 21/31;
(Continued)

(56) References Cited

U.S. PATENT DOCUMENTS 10,057,401 B2    8/2018  Kim et al.
10,747,269 B1    8/2020  Choi et al.
(Continued)

FOREIGN PATENT DOCUMENTS

JP    2013105312 A    5/2013
KR   20110063410 A    6/2011
(Continued)

OTHER PUBLICATIONS

International Search Report for PCT/KR2021/018110 mailed Mar. 10, 2022, 4 pages.
(Continued)

*Primary Examiner* — Edward Zee
(74) *Attorney, Agent, or Firm* — NIXON & VANDERHYE P.C.

(57) ABSTRACT

An electronic device, according to various embodiments, comprises: a first housing; a second housing movable with respect to the first housing; a motor configured to move the second housing to be retracted and/or drawn out with respect to the first housing; a display having a display area having a size that can be changed according to the movement of the second housing; and a processor operatively connected to the motor and the display. The processor may be configured to: detect an occurrence of an event related to at least one external electronic device connected to the electronic device; determine whether the event satisfies a specified
(Continued)

condition for changing the size of the display area; and in response to the event satisfying the specified condition, control the motor to move the second housing to change the size of the display area.

13 Claims, 27 Drawing Sheets

(58) Field of Classification Search
CPC .......... G06F 21/35; G06F 21/36; G06F 21/44; G06F 21/45
See application file for complete search history.

(56) References Cited

U.S. PATENT DOCUMENTS

| | | | |
|---|---|---|---|
| 11,252,826 | B2 | 2/2022 | Park et al. |
| 11,282,167 | B1 | 3/2022 | Lee |
| 2013/0058063 | A1 | 3/2013 | Obrien |
| 2013/0265221 | A1 | 10/2013 | Lee et al. |
| 2014/0210706 | A1 | 7/2014 | Park et al. |
| 2015/0029229 | A1 | 1/2015 | Voutsas |
| 2015/0227249 | A1 | 8/2015 | Kim et al. |
| 2016/0112667 | A1 | 4/2016 | Park et al. |
| 2016/0306534 | A1 | 10/2016 | Woo et al. |
| 2016/0307545 | A1* | 10/2016 | Lee ........................ G09G 5/346 |
| 2017/0013705 | A1 | 1/2017 | Jahng |
| 2017/0140504 | A1* | 5/2017 | Jeong ........................ G06T 3/40 |
| 2017/0357292 | A1 | 12/2017 | Cho et al. |
| 2018/0089403 | A1* | 3/2018 | Watson ................... G06F 21/45 |
| 2019/0197960 | A1 | 6/2019 | Kim |
| 2019/0261519 | A1* | 8/2019 | Park ...................... G06F 1/1677 |
| 2019/0384438 | A1 | 12/2019 | Park et al. |
| 2020/0076940 | A1 | 3/2020 | Kim et al. |

FOREIGN PATENT DOCUMENTS

| | | |
|---|---|---|
| KR | 20140095711 A | 8/2014 |
| KR | 20150008997 A | 1/2015 |
| KR | 20150094477 A | 8/2015 |
| KR | 101638167 B1 | 7/2016 |
| KR | 10-2016-0120551 A1 | 10/2016 |
| KR | 20170090295 A | 8/2017 |
| KR | 20170140976 A | 12/2017 |
| KR | 20190079241 A | 7/2019 |
| KR | 10-2019-0101184 A1 | 8/2019 |
| KR | 20190141518 A | 12/2019 |
| KR | 102111376 B1 | 5/2020 |
| KR | 20200075809 A | 6/2020 |
| WO | 2015015788 A1 | 2/2015 |

OTHER PUBLICATIONS

Written Opinion of the ISA for PCT/KR2021/018110 mailed Mar. 10, 2022, 4 pages.
Korean Office Action dated Aug. 4, 2025 issued in Korean Patent Application No. 10-2021-0006828 and English translation, 17 pp.

* cited by examiner

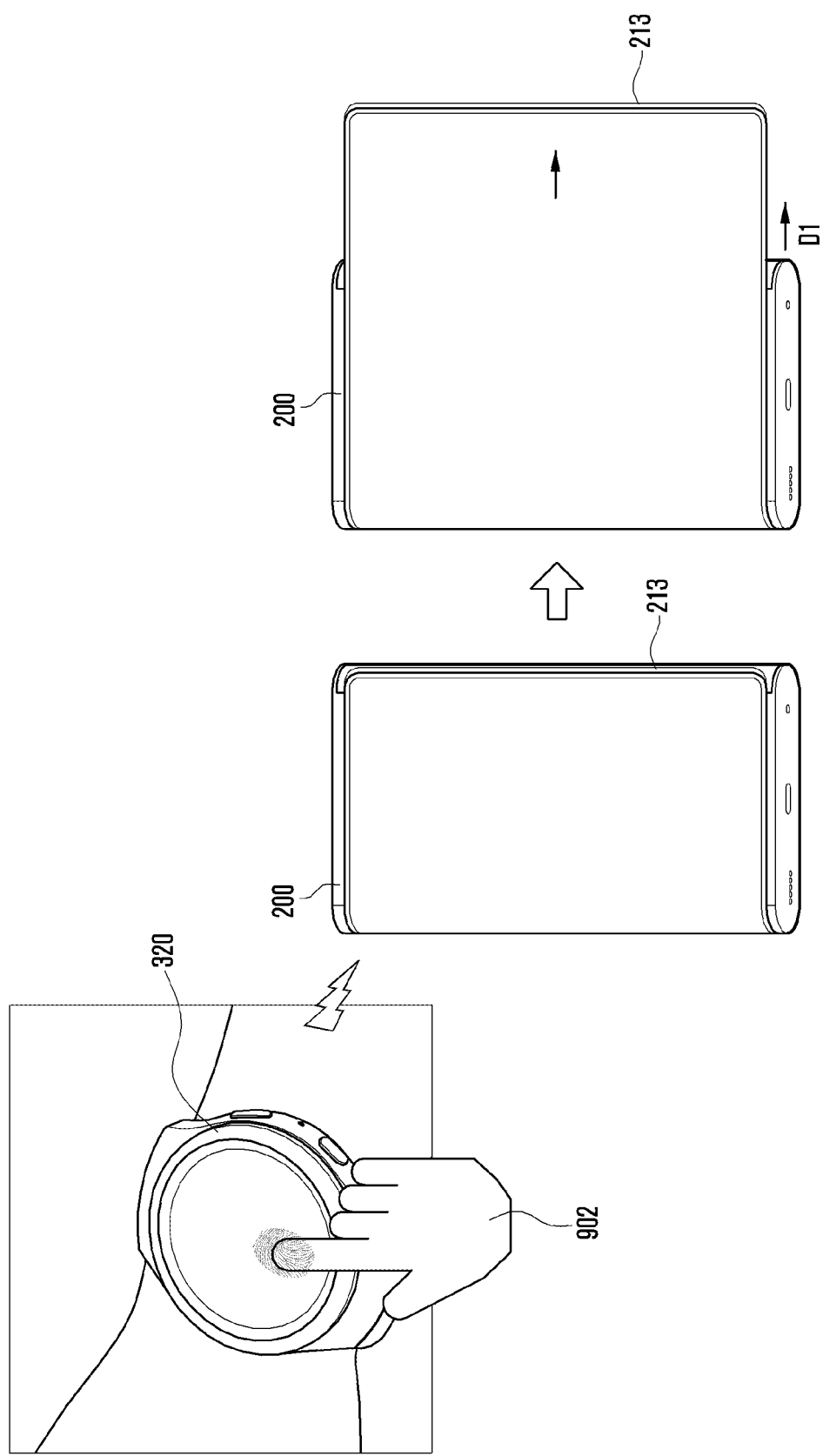

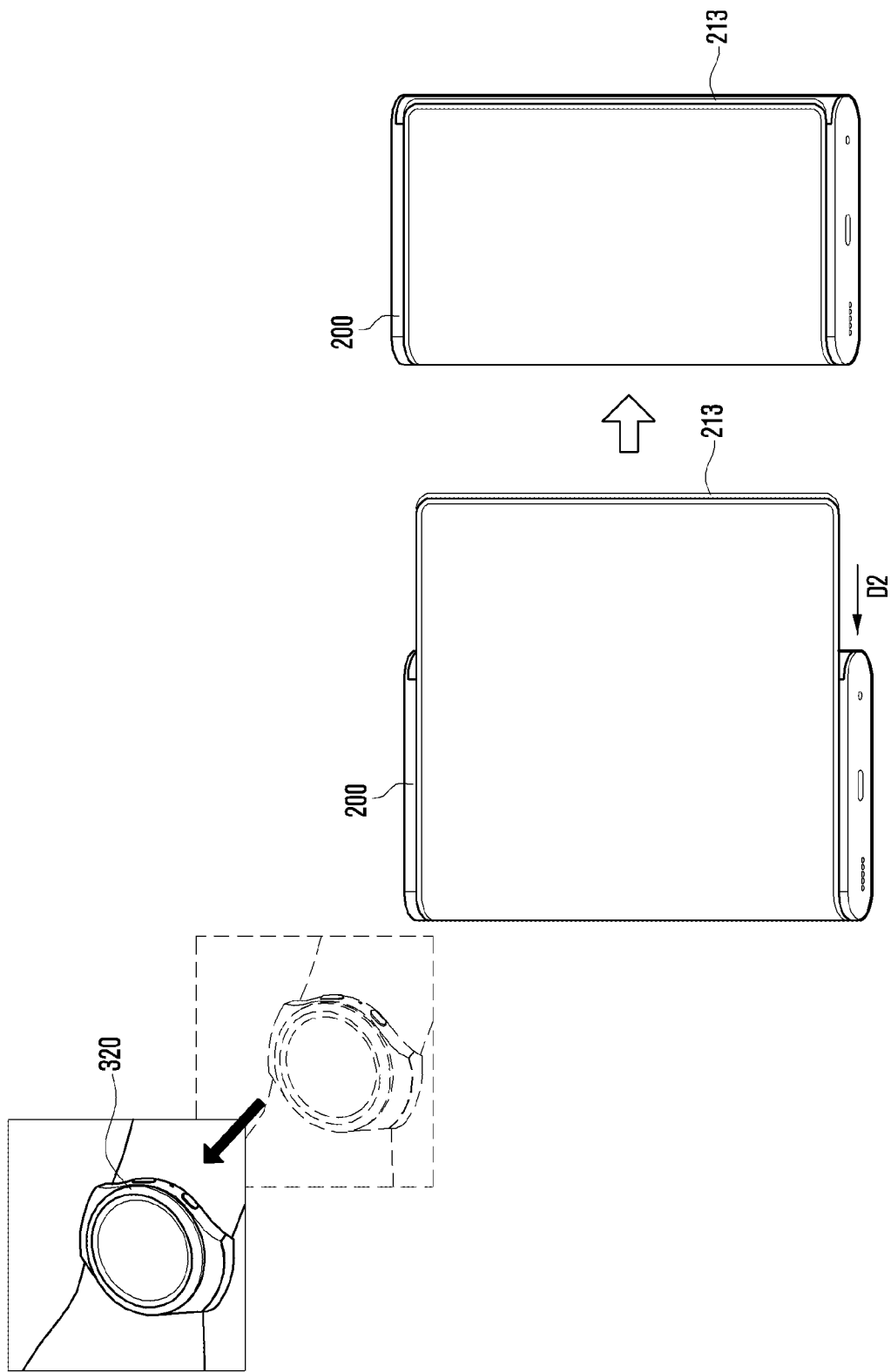

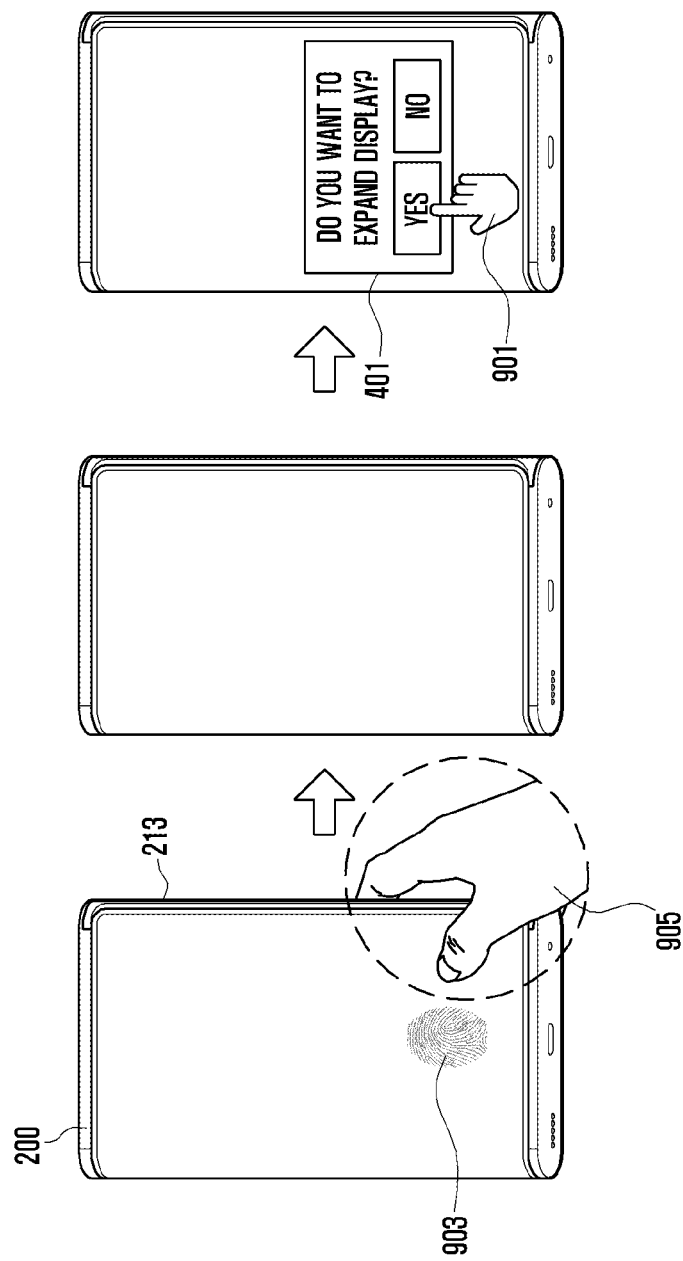

ELECTRONIC DEVICE COMPRISING FLEXIBLE DISPLAY

CROSS-REFERENCE TO RELATED APPLICATIONS

This application is a continuation of International Application No. PCT/KR2021/018110 designating the United States, filed on Dec. 2, 2021, in the Korean Intellectual Property Receiving Office and claiming priority to Korean Patent Application No. 10-2020-0168029, filed on Dec. 4, 2020, in the Korean Intellectual Property Office, and to Korean Patent Application No. 10-2021-0006828, filed on Jan. 18, 2021, in the Korean Intellectual Property Office, the disclosures of all of which are incorporated by reference herein in their entireties.

BACKGROUND

Field

The disclosure relates to an electronic device including a display in which the size of a display area may be changed in response to a movement of a housing.

Description of Related Art

An electronic device is implemented using a form factor capable of providing a relatively larger screen while a user does not feel an uncomfortable size in grasping the electronic device. Among form factors of the electronic device, a slidable form factor has been in the spotlight as a next-generation form factor because a display can be expanded in a slide way.

The slide way may include a slide-in method of a part of a flexible display being led into an internal space of the electronic device or a slide-out method of a part of the flexible display being led out from the internal space of the electronic device.

An electronic device implemented using the slidable form factor may be implemented to have a relatively small size because the flexible display slides in the inside of the electronic device in the state in which a user carries the electronic device, and may output content through a relatively large size because the flexible display slides out to the outside of the electronic device in the slide-out state.

Due to the emergence of the flexible display, consumers expect that an electronic device having a new form or a new concept is launched. Various manufacturing companies launch an electronic device having a new concept in order to satisfy consumers' expectation.

SUMMARY

Embodiments of the disclosure may provide an electronic device having a fully new form factor using a flexible display and various operations which may be performed through the electronic device.

Embodiments of the disclosure may provide an electronic device in which controlling the electronic device from various aspects centering around user convenience will be achievable.

The disclosure is not limited to the aforementioned embodiments, and the other examples not described above may be evidently understood from the following description by a person having ordinary knowledge in the art to which the disclosure pertains.

An electronic device according to various example embodiments may include: a first housing; a second housing movable with respect to the first housing; a motor configured to move the second housing to be led in and/or led out from the first housing; a display having a display area having a size changeable in response to a movement of the second housing; and a processor operatively connected to the motor and the display. The processor may be configured to: check a generation of an event related to at least one external electronic device connected to the electronic device, determine whether the event satisfies a designated condition for changing the size of the display area, and control the motor so that the second housing is moved to change the size of the display area, in response to the event satisfying the designated condition.

An electronic device according to various example embodiments may include: a first housing; a second housing movable with respect to the first housing; a motor configured to move the second housing to be led in and/or led out from the first housing; a display having a display area having a size changeable in response to a movement of the second housing; and a processor operatively connected to the motor and the display. The processor may be configured to: check a generation of an event related to a state of the electronic device, determine whether the event satisfies a designated condition for changing the size of the display area, and control the motor so that the second housing is moved to adjust the size of the display area, in response to the event satisfying the designated condition.

According to various example embodiments a user can use an electronic device more conveniently because a new interface using a new form factor is provided.

According to various example embodiments, controlling the electronic device centering around user convenience can be provided.

According to various example embodiments, a device including a flexible display in which the size of a display area is changed, a user-convenient environment can be provided by expanding and/or reducing the display area even without a separate manipulation of the user in response to a designated event being generated.

According to various example embodiments, an environment necessary for a user can be provided although the user does not perform a separate operation, because a display area is expanded and/or reduced and simultaneously a related application is executed in response to a designated event being generated.

According to various example embodiments, although a designated event is generated, various problems which may occur because a display area is expanded or reduced regardless of a user's intention can be prevented and/or reduced by adding an operation of receiving a user's input.

BRIEF DESCRIPTION OF THE DRAWINGS

In relation to the description of the drawings, the same or similar reference numerals may be used with respect to the same or similar elements. Further, the above and other aspects, features and advantages of certain embodiments of the present disclosure will be more apparent from the following detailed description, taken in conjunction with the accompanying drawings, in which:

FIG. 5B is a diagram illustrating an example operation of the electronic device according to the flowchart of FIG. 5A according to various embodiments;

FIG. 6B is a diagram illustrating an example operation of the electronic device according to the flowchart of FIG. 6A according to various embodiments;

FIG. 9 is a diagram illustrating an example operation of the electronic device according to various embodiments.

DETAILED DESCRIPTION

Figure 1:
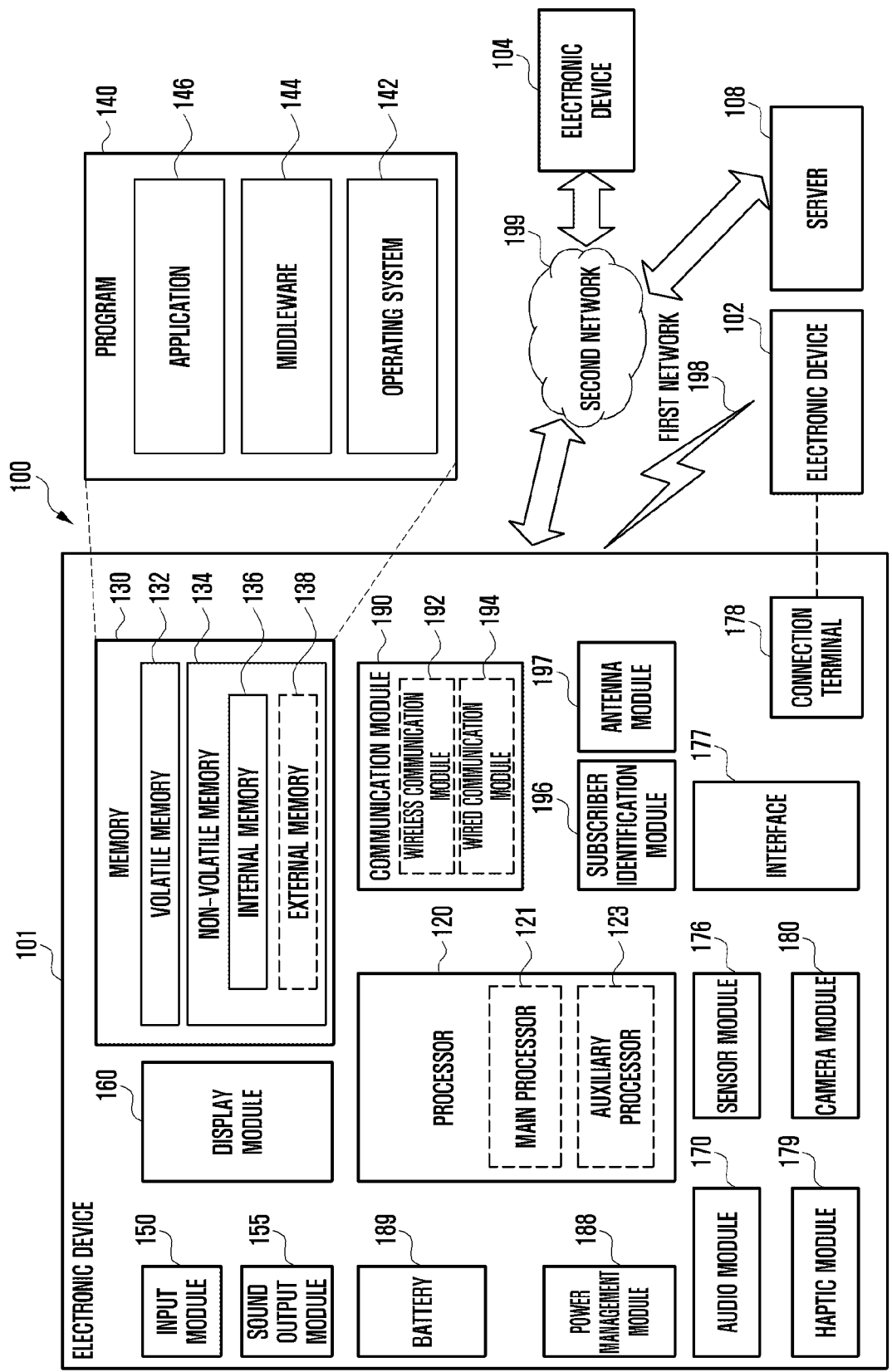
FIG. 1 is a block diagram illustrating an example electronic device within a network environment 100 according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
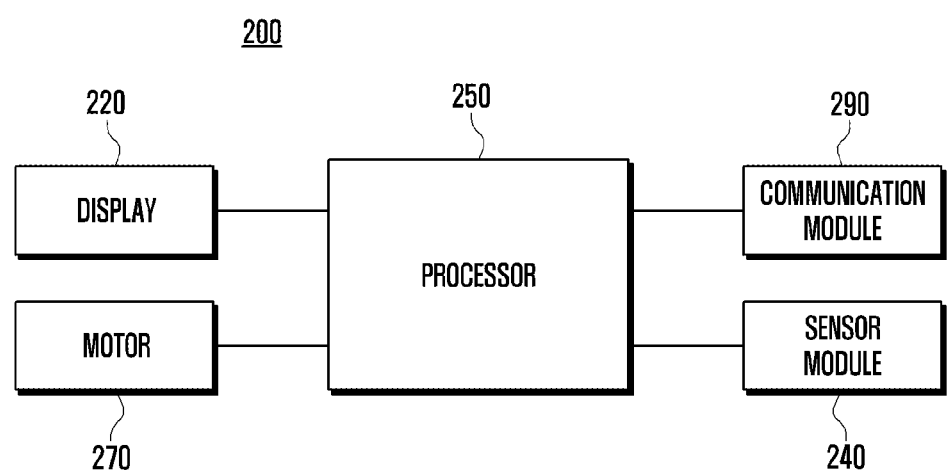
FIG. 2A is a block diagram illustrating an example configuration of an electronic device according to various embodiments.

FIG. 2A is a block diagram illustrating an example configuration of the electronic device according to various embodiments.

With reference to FIG. 2A, an electronic device 200 (e.g., the electronic device 101 in FIG. 1) may include a processor (e.g., the processor 120 in FIG. 1) (e.g., including processing circuitry) 250, a display (e.g., the display 160 in FIG. 1) 220, a sensor module (e.g., the sensor module 176 in FIG. 1) (e.g., including at least one sensor) 240, a communication module (e.g., the communication module 190 in FIG. 1) (e.g., including communication circuitry) 290 and/or a motor 270. The components included in FIG. 2A relate to some of the components included in the electronic device 200. In addition, the electronic device 200 may include various components as illustrated in FIG. 1.

According to various embodiments, the processor 250 may be the processor 120 that has been described with reference to FIG. 1. The display 220 may be the display module 160 that has been described with reference to FIG. 1. The processor 250 may be connected to the display 220, and may include various processing circuitry to process information so that various types of information are visually displayed through the display 220. The processor 250 may be connected to the sensor module 240, and may receive various types of information measured by the sensor module 240. Furthermore, the processor 250 may be connected to the motor 270, and may control the motor 270.

According to various embodiments, the electronic device 200 may include a first housing (e.g., a first housing 211 in FIG. 2B) and a second housing (e.g., a second housing 213 in FIG. 2B) that is slidably installed with respect to the first housing 211.

According to various embodiments, the sensor module 240 may include at least one sensor. For example, the sensor module 240 may include a distance sensor capable of measuring a distance between the first housing 211 and the second housing 213. The distance sensor may be a sensor that measures the degree that the second housing 213 is expanded as the second housing 213 slides with respect to the first housing 211.

According to various embodiments, the sensor module 240 may include a distance sensor capable of measuring a distance from the second housing 213 to an obstacle in a direction in which the second housing 213 is expanded.

In an embodiment, the distance sensor included in the sensor module 240 may include at least one of an optical distance sensor, a distance sensor using an ultrasonic method, or a distance sensor using a radio wave method. In addition, various sensors capable of measuring a distance or displacement may be included in the distance sensor.

According to various embodiments, the distance sensor may measure the degree that the housing is expanded and/or a distance up to an obstacle in various ways. In an embodiment, the distance sensor may measure a distance using a time of flight (TOF) method. The distance sensor may measure a distance using the time that is taken for light or a radio wave output by the distance sensor to be returned by being reflected by another object. In an embodiment, the distance sensor may measure a distance using a light quantity measuring method. The distance sensor capable of measuring a distance using the light quantity measuring method may measure the distance based on the amount of light that is input to the distance sensor. The distance sensor may determine that a distance is longer as the amount of light received by the distance sensor is smaller and that a distance is shorter as the amount of light received by the distance sensor is larger. In an embodiment, the distance sensor may measure a distance in a way to analyze a pattern of light that is radiated and displayed in a specific object. Such a distance sensor may measure a distance between the two points in a pattern of light that is displayed in a specific object. It may be determined that a distance between the distance sensor and a specific object is longer as an interval between the two points is smaller and a distance between the distance sensor and a specific object is shorter as an interval between the two points is larger. In addition, the distance sensor may measure a distance in various ways.

According to various embodiments, the sensor module 240 may include an expansion detection sensor capable of detecting the expansion of the second housing 213. The expansion detection sensor may measure a state according to a distance between the second housing 213 and the first housing 211. In an embodiment, the expansion detection sensor may generate an electrical signal based on a degree of the expansion of the second housing 213. For example, the expansion detection sensor may be a hall sensor that detects a change in the magnetic field according to the expansion of the housing, a sensor that detects an interaction of a magnet, a sensor that detects the pressing of a physical switch, or a sensor that detects a contact between terminals. The expansion detection sensor may detect the state in which the second housing 213 is led out to a maximum extent, the state in which in which the second housing 213 is led in to a maximum extent, or an intermediate state therebetween.

According to various embodiments, the sensor module 240 may include a pressure sensor. The pressure sensor may measure pressure that is applied to the electronic device 200. In an embodiment, the pressure sensor may be installed on at least one surface of an upper surface, a lower surface, a rear surface and/or a side surface of the electronic device 200, and may measure the size of pressure that is applied to the electronic device 200 and/or the direction of the pressure.

According to various embodiments, the sensor module 240 may include a grip sensor. The grip sensor may detect that the electronic device 200 has been grasped. In an embodiment, the grip sensor may detect (or sense or check) capacitance (or an electrostatic capacity) (or a change in capacitance) that is changed by an external object (e.g., the human body or an object) that approaches or touches the electronic device 200. In an embodiment, when an external object approaches or touches the electronic device 200, capacitance that is detected by the grip sensor may be different depending on the external object (or a dielectric constant of the external object). For example, when the human body approaches or touches the electronic device 200, the grip sensor may detect capacitance having first intensity. When an external electronic device (e.g., a pad for wireless charging) approaches or touches the electronic device 200, the grip sensor may detect capacitance having intensity equal to or smaller than the first intensity.

According to various embodiments, the sensor module 240 may include a position sensor that measures geographical information of the electronic device 200. According to an embodiment, the position sensor may include a global positioning system (GPS) sensor.

According to various embodiments, the sensor module 240 may include a fingerprint recognition sensor. According to an embodiment, the fingerprint recognition sensor may be disposed on a rear surface (e.g., an under panel) of the display 220, and may be implemented so that the fingerprint recognition sensor is not exposed to the outside. For example, the electronic device 200 may have the fingerprint recognition sensor embedded in the rear surface (e.g., at the bottom of a display panel) of the display, and may recognize a fingerprint that has come into contact with (or touched) a front surface (e.g., a display surface (or screen)) of the display. According to an embodiment, the fingerprint recognition sensor may include a component using an optical method, an ultrasonic method and/or a capacitance method (or a semiconductor method). The optical method may be a method of obtaining a fingerprint image (or video) that is reflected by visible ray. The ultrasonic method may be a method of obtaining a fingerprint image using an ultrasound examination principle. The capacitance method may be a method of obtaining a fingerprint image using a difference between electric capacities. For example, the optical method may be a method of illuminating a platen and recognizing an image of a fingerprint that is reflected based on a fingerprint form of the end of a finger that has been laid on the platen. For example, the semiconductor method may be a method using a biological characteristic, in a way to read, as an electrical signal, a special shape of a fingerprint that has touched a surface of a chip when the end of a finger is directly brought into contact with the surface of the chip using an electrical conduction characteristic of the skin. According to various embodiments, the fingerprint recognition sensor may be constructed in the form of a touch sensor. Electrodes may be disposed in the touch sensor at an interval that is smaller than the size of a valley and ridge of a fingerprint and an interval between the valley and the ridge.

According to an embodiment, the fingerprint recognition sensor may be implemented in a swipe type or a fixed area type. For example, the swipe type is a method of dragging a location of the fingerprint recognition sensor by a finger, and may be a method of sequentially recognizing fingers (e.g., fingerprints) that are dragged on sensor electrodes that have been disposed in a one-dimensional way or linearly and then synthesizing the recognized fingers in the form of a two-dimensional fingerprint image through post-processing. For example, the fixed area type may be a method of obtaining a two-dimensional fingerprint image while a finger touches on a sensor that has been disposed in a two-dimensional way. According to an embodiment, electrodes may be disposed in the touch sensor for recognizing a fingerprint in a one-dimensional or two-dimensional way.

According to various embodiments of the disclosure, the processor 250 may provide (or display), on the display 220, an indicating object (e.g., a fingerprint image object and/or guide text) for providing guidance to a fingerprint input location (or a location at which the fingerprint recognition sensor is disposed) of the fingerprint recognition sensor (e.g., a display fingerprint recognition sensor) through a corresponding area in which the fingerprint recognition sensor has been disposed. For example, the processor 250 may display an indicating object based on an area (e.g., an area in which the fingerprint recognition sensor has been disposed) for providing a user with guidance to a fingerprint input in a situation in which the fingerprint input is required. According to an embodiment, when providing the indicating object, the processor 250 may include an operation of activating a function for receiving a touch input in an area in which the fingerprint recognition sensor has been disposed and a surrounding area thereof in the display 220 and/or may make the state of the function for receiving a touch input a deactivation state in the remaining area except the area (e.g., the area in which the fingerprint recognition sensor has been disposed and a surrounding area thereof) for activating the touch input function.

Figure 2B:
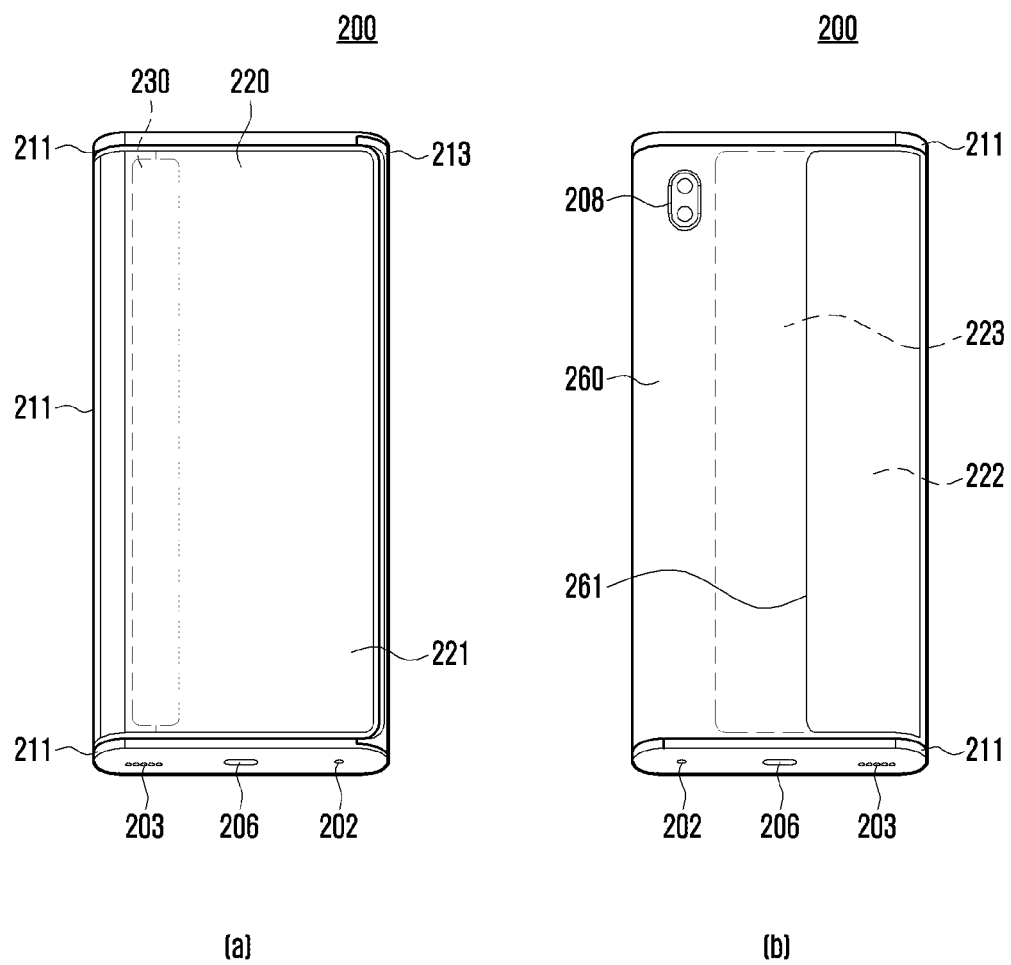
FIG. 2B is a diagram illustrating front and rear perspective views of the electronic device in a closed or unexpanded state according to various embodiments.
Figure 2C:
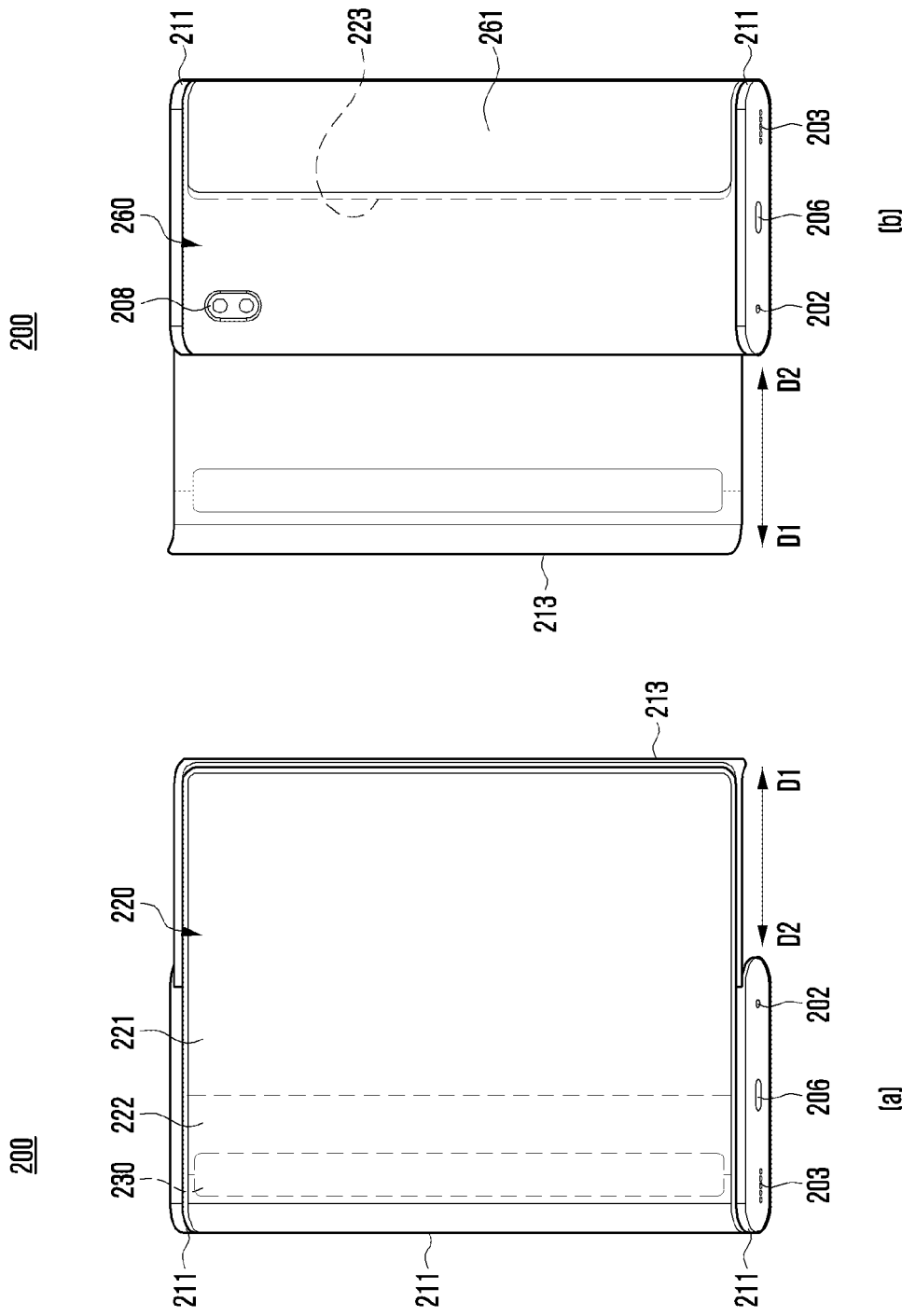
FIG. 2C is a diagram illustrating front and rear perspective views according to expansion of the housing of the electronic device illustrated in FIG. 2B according to various embodiments.

FIG. 2B is a diagram including front and rear perspective views of the electronic device according to various embodiments. FIG. 2C is a diagram including front and rear perspective views according to the expansion of the housing of the electronic device illustrated in FIG. 2B according to various embodiments.

The electronic device 200 according to various embodiments may be an electronic device 200 including the display 220 in which the size of a display area may be varied. The display area may refer, for example, to an area in which visual information may be displayed. According to various embodiments, the electronic device 200 may display more information on the display 220 as the size of the display area of the display 220 is increased. The structure of a housing of the electronic device 200, which is described hereinafter, is merely an example of an electronic device in which the size of the display area may be varied. In addition, the size of the display area of the display 220 may be varied in various ways.

According to various embodiments, the electronic device 200 may include a slidable housing (e.g., the first housing 211 and the second housing 213). With reference to FIG. 2A, the electronic device 200 may include the first housing 211, the second housing 213, and the display 220.

According to various embodiments, the display 220 may be a flexible display. A display area of the display 220 may be expanded or reduced in response to a movement of the second housing 213 with respect to the first housing 211. For example, as the second housing 213 is moved in a first direction (e.g., a direction D1 in FIG. 2C) on the basis of FIG. 2B with respect to the first housing 211, the display area of the display 220 may be expanded. As the second housing 213 is moved in a second direction (e.g., a direction D2 in FIG. 2C) with respect to the first housing 211, the display area of the display 220 may be reduced. At least some area (e.g., a first area 221 in FIG. 2B) of the display 220 may include a front surface of the electronic device 200. The at least some area 221 may be exposed (e.g., visible) to the outside. The remaining area (e.g., a second area 222 and/or a third area 223 in FIG. 2B) may be accommodated within the electronic device 200. The front surface may refer, for example, to a surface that faces a direction +Z on the basis of FIG. 2B. For example, the first area 221 of the display 220 may include the front surface of the electronic device 200 on the basis of FIG. 2B. The at least some area 221 may be exposed (e.g., visible) to the outside. The second area 222 and the third area 223 may be accommodated within the electronic device 200. The second area 222 and the third area 223 may be exposed (e.g., visible) to the outside as the second housing 213 is moved with respect to the first housing 211.

According to various embodiments, a rear surface cover 260 of the electronic device 200 may cover a rear surface of the electronic device 200. The rear surface of the electronic device 200 may be a surface that faces the front surface of the electronic device. In this case, the rear surface may refer, for example, to a surface that faces a direction −Z on the basis of FIG. 2B. In an embodiment, the rear surface cover 260 may include a transparent area 261. The transparent area 261 may be one area of the rear surface cover 260, which is fabricated using a transparent material. In this case, some area (e.g., the second area 222 and/or the third area 223) of the display 220, which have been received within the electronic device 200, may be visually shown to the outside of the electronic device 200 through the transparent area 261.

According to various embodiments, the first housing 211 may accommodate the display 220. For example, a recess for accommodating a part of the display 220 may be formed in a front surface of the first housing 211. In this case, the front surface may refer, for example, to a surface that faces the direction +Z on the basis of FIG. 2B. According to an embodiment, at least a part of the first housing 211 may be formed of a metal material or a non-metal material having a set size of stiffness in order to support the display 220.

According to various embodiments, the second housing 213 may be slidably coupled to the first housing 211. The second housing 213 may slide in the first direction (e.g., the direction D1 in FIG. 2C) or the second direction (e.g., the direction D2 in FIG. 2C) as illustrated in FIG. 2C, for example. At least some area of the second housing 213 may be fixed to the display 220. At least some of the second housing 213 may be formed of a metal material or a non-metal material having a set size of stiffness in order to support the display 220.

According to various embodiments, the electronic device 200 may include the motor 270 (not illustrated) within the housing. According to various embodiments, a processor (e.g., the processor 120 in FIG. 1 or the processor 250 in FIG. 2A) may control the display 220 and the motor 270 (the motor 270 in FIG. 2A). According to various embodiments, the motor 270 may be a component that is driven so that the second housing 213 slides with respect to the first housing 211.

According to an embodiment, the processor 250 of the electronic device 200 may transfer a control signal to the motor 270.

According to an embodiment, the motor 270 may be driven based on at least one of a plurality of control signals transferred by the processor. For example, the motor 270 may receive a control signal from the processor when various events (e.g., the execution of an application) are generated in the electronic device 200.

According to an embodiment, the motor 270 may be installed in any one of the first housing 211 and the second housing 213 and may slide the second housing 213 with respect to the first housing 211, in response to at least one of a plurality of control signals that have been received from the processor. According to an embodiment, the motor 270 may be substituted with various components that slide the second housing 213 with respect to the first housing 211. According to an embodiment, various types of actuators may be used. For example, an actuator capable of moving a cylinder that performs a rectilinear movement may be used.

According to various embodiments, a sliding shaft 230 may be disposed within the electronic device 200. The sliding shaft 230 may provide guidance to the expansion or reduction of the display 220 by the sliding of the second housing 213 for the first housing 211. Areas (e.g., the second area 222 and the third area 223) of the display, which have been received within the electronic device 200, may be moved to the front surface of the electronic device 200 via the sliding shaft 230, and may be visible to the front surface of the electronic device 200. In an embodiment, the sliding shaft 230 may be rotated by an operation of the motor 270. The second housing 213 may slide with respect to the first housing 211 by the rotation of the sliding shaft 230. In an embodiment, the sliding shaft 230 may be a component that simply provides guidance to a movement of the display 220 according to the sliding of the second housing 213. The sliding shaft 230 may provide guidance to the display 220 so that the display 220 does not deviate from a sliding operation.

According to various embodiments, the electronic device 200 may further include a front surface camera module (not illustrated) that is exposed to the front surface of the electronic device 200 and a rear surface camera module 208 that is exposed to the rear surface thereof.

According to various embodiments, the electronic device 200 may further include a connector hole 206. The connector hole 206 may include a first connector hole 206 capable of accommodating a connector (e.g., USB connector) for transmitting and receiving power and/or data to and from an external electronic device and/or a second connector hole (not illustrated) (e.g., an earphone jack) capable of accommodating a connector for transmitting and receiving audio signals to and from an external electronic device.

According to various embodiments, the electronic device 200 may further include an audio module (e.g., 202 and/or 203). The audio module (e.g., 202 and/or 203) may include a microphone hole 202 and/or a speaker hole 203. A microphone for obtaining an external sound may be disposed within the microphone hole 202. The speaker hole 203 may include an external speaker hole 203 and/or a receiver hole for a call (not illustrated). In an embodiment, the speaker hole 203 and the microphone hole 202 may be implemented as one hole, or a speaker may be included without the speaker hole 203 (e.g., a piezo speaker). In the electronic device 200 according to various embodiments, the size of the display area of the display 220 may be varied. A change in the size of the display area may be performed through a sliding operation of the display 220 as described above.

Figure 3:
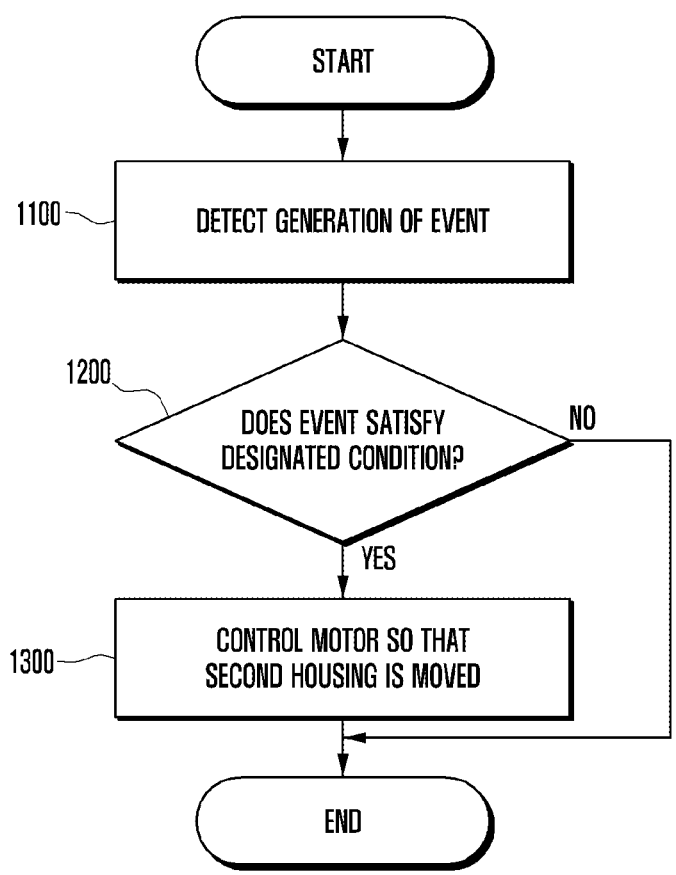
FIG. 3 is a flowchart illustrating an example method of controlling, by a processor, an electronic device according to various embodiments.

FIG. 3 is a flowchart illustrating an example method of controlling, by a processor, an electronic device according to various embodiments.

According to various embodiments, an electronic device (e.g., the electronic device 200 in FIG. 2A) may include the rollable type and/or slidable type electronic device in which the display area of a display (e.g., the display 220 in FIG. 2B) is expanded or reduced in response to a movement of a second housing (e.g., the second housing 213 in FIG. 2B) from a first housing (e.g., the first housing 211 in FIG. 2B).

According to various embodiments, in operation 1100, a processor (e.g., the processor 250 in FIG. 2A) may check (or detect) the generation of an event.

According to an embodiment, the event may include an event related to the connection of an external electronic device. For example, the event may include that an external electronic device is connected to the electronic device 200. For example, the event may include that information indicating that an external electronic device connected to the electronic device 200 has received user authentication information is received from the external electronic device. For example, the event may include that the connection state of an external electronic device connected to the electronic device 200 is changed. According to an embodiment, the processor 250 may check the generation of an event based on various types of information that have been received by a communication module (e.g., the communication module 290 in FIG. 2A). For example, the communication module 290 may communicate with an external electronic device over a first network (e.g., a short distance network such as Bluetooth). According to an embodiment, the communication module 290 may receive various types of information (e.g., external electronic device identification information, network identification information, and information transmitted by an external electronic device) from the external electronic device.

According to an embodiment, the event may include an event related to a state of the electronic device 200. For example, the event may include that the electronic device 200 receives a user input for user authentication. For example, an event related to the state of the electronic device 200 may include that the electronic device 200 is connected to a network (e.g., Wi-Fi). For example, the event may include that a position sensor (e.g., a GPS sensor) of the electronic device 200 measures a location of the electronic device 200. For example, the event may include that an application generates a message. According to an embodiment, the processor 250 may check the generation of an event based on various types of information that have been measured by a sensor module (e.g., the sensor module 240 in FIG. 2A). For example, the sensor module 240 may measure state information (e.g., a location of the electronic device) of the electronic device 200 and/or external information (e.g., bio information for user identification and/or authentication, such as an iris, face, or fingerprint of a user, and a touch operation that is input by a user).

According to various embodiments, in operation 1200, the processor 250 may determine whether the event satisfies a designated condition for changing the size of a display area.

According to an embodiment, the designated condition may include a condition related to whether an external electronic device connected to the electronic device 200 is a designated external electronic device. According to an embodiment, the designated condition may include a condition related to whether user authentication information received by an external electronic device connected to the electronic device 200 is designated information. According to an embodiment, the designated condition may include a condition in which an external electronic device switches to a state in which the connection of the external electronic device with the electronic device 200 has been released.

According to an embodiment, the designated condition may include a condition related to whether a user input for user authentication, which has been received by the electronic device 200, is a designated input. For example, the designated condition may include a condition related to whether a touch operation of a user, which has been received by the electronic device 200, is a designated touch operation. As another example, the designated condition may include a condition related to whether the fingerprint input of the user received by the electronic device 200 is a designated fingerprint. As still another example, the designated condition may include a condition related to whether a location at which a user's fingerprint received by the electronic device 200 has been input is a designated location.

According to an embodiment, the designated condition may include a condition related to whether a network (e.g., Wi-Fi) with which the electronic device 200 communicates is a designated network. According to an embodiment, the designated condition may include a condition related to whether location information of the electronic device 200, which has been measured by the position sensor, is designated location information. According to an embodiment, the designated condition may include a condition related to whether a current time is included in a designated time zone. According to an embodiment, the designated condition may include a condition in which a message generated by an application is a designated message. For example, the designated condition may include that a message (e.g., SMS, MMS, or RCS) generated by an SMS application is a designated message (e.g., a message received from a designated sender), a message (e.g., SMS, MMS, or RCS) received from an external electronic device is a designated message (e.g., a message received from a designated external electronic device), or a message (e.g., an application notification) transmitted by an application in a framework layer is a designated message.

According to various embodiments, the processor 250 may output notification that requests a user input for whether to change the size of the display area, in response to the event satisfying the designated condition (operation 1200—Y). For example, the processor 250 may provide the notification in various ways, such as haptic, a sound, or a screen.

According to an embodiment, the processor 250 may display the notification in the display area. For example, the processor 250 may display a notification message in the display area and/or may provide the notification by displaying a color and/or form of a UI for unlocking differently from a UI having a default state as in the embodiments illustrated in FIGS. 10A, 10B, 10C, 10D, 10E, and 10F.

According to various embodiments, in operation 1300, the processor 250 may control the motor 270 so that the second housing 213 is moved in response to the event satisfying the designated condition (operation 1200—Y).

According to various embodiments, the motor 270 may be controlled so that the second housing 213 is moved, in response to a user input to change the size of the display area being received.

According to an embodiment, the processor 250 may receive, from a user, the user input to change the size of the display area using any one method, among a motion input, a voice input, touch input, a pattern input, and a fingerprint input. For example, the processor 250 may receive the user input to change the size of the display area through a UI whose color and/or form have been changed, as in the examples illustrated in FIGS. 10A, 10B, 10C, 10D, 10E, and 10F.

According to an embodiment, the processor 250 may control the motor 270 so that the second housing 213 is moved in an expansion direction (e.g., the first direction D1 in FIG. 2C), in response to the satisfied designated condition being a condition for the expansion of the display area. According to an embodiment, the processor 250 may control the motor 270 so that the second housing 213 is moved in a reduction direction (e.g., the second direction D2 in FIG. 2C), in response to the satisfied designated condition being a condition for the reduction of the display area.

Figure 4A:
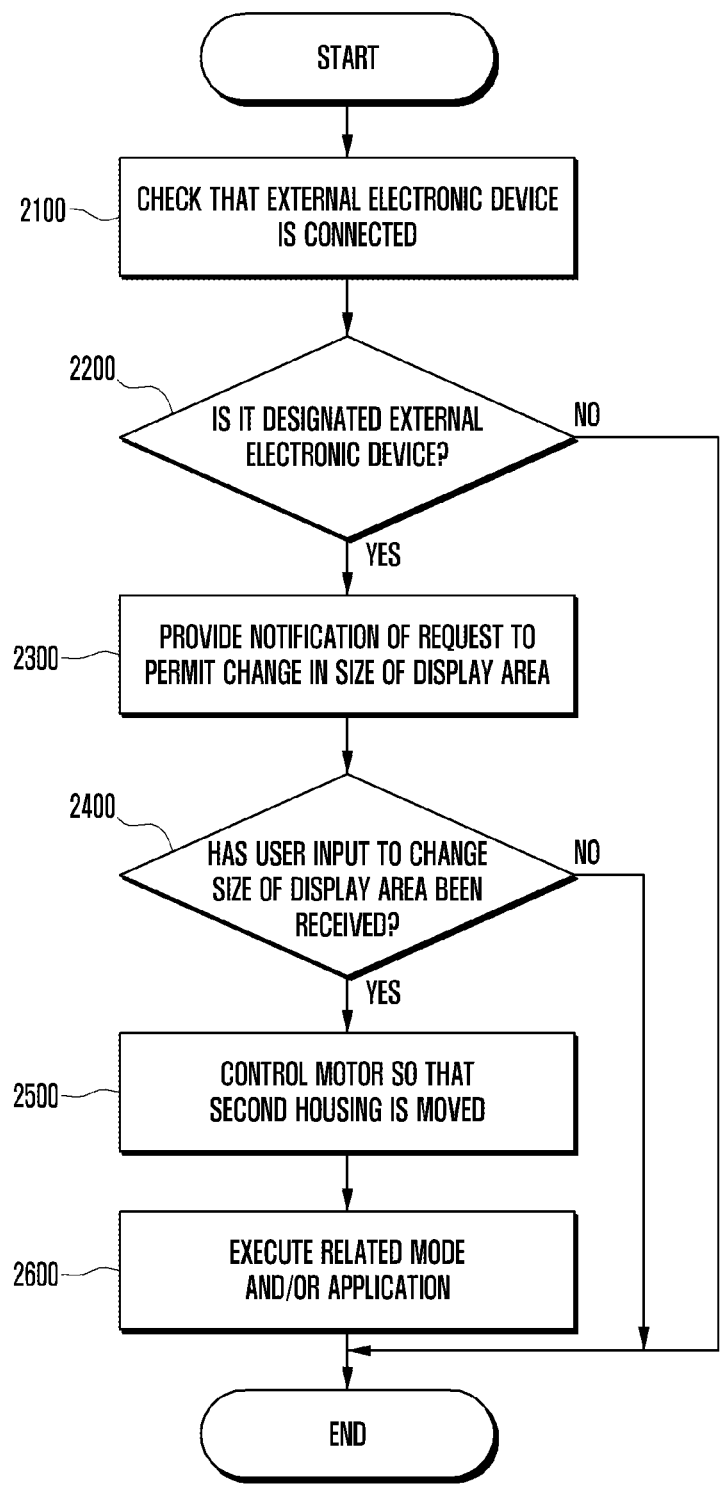
FIG. 4A is a flowchart illustrating an example operation of controlling, by a processor, an electronic device in response to the electronic device being connected to an external electronic device according to various embodiments.

FIG. 4A is a flowchart illustrating an example operation of controlling, by a device 200 in FIG. 2A) in response to the electronic device 200 being connected to an external electronic device according to various embodiments.

Figure 4B:
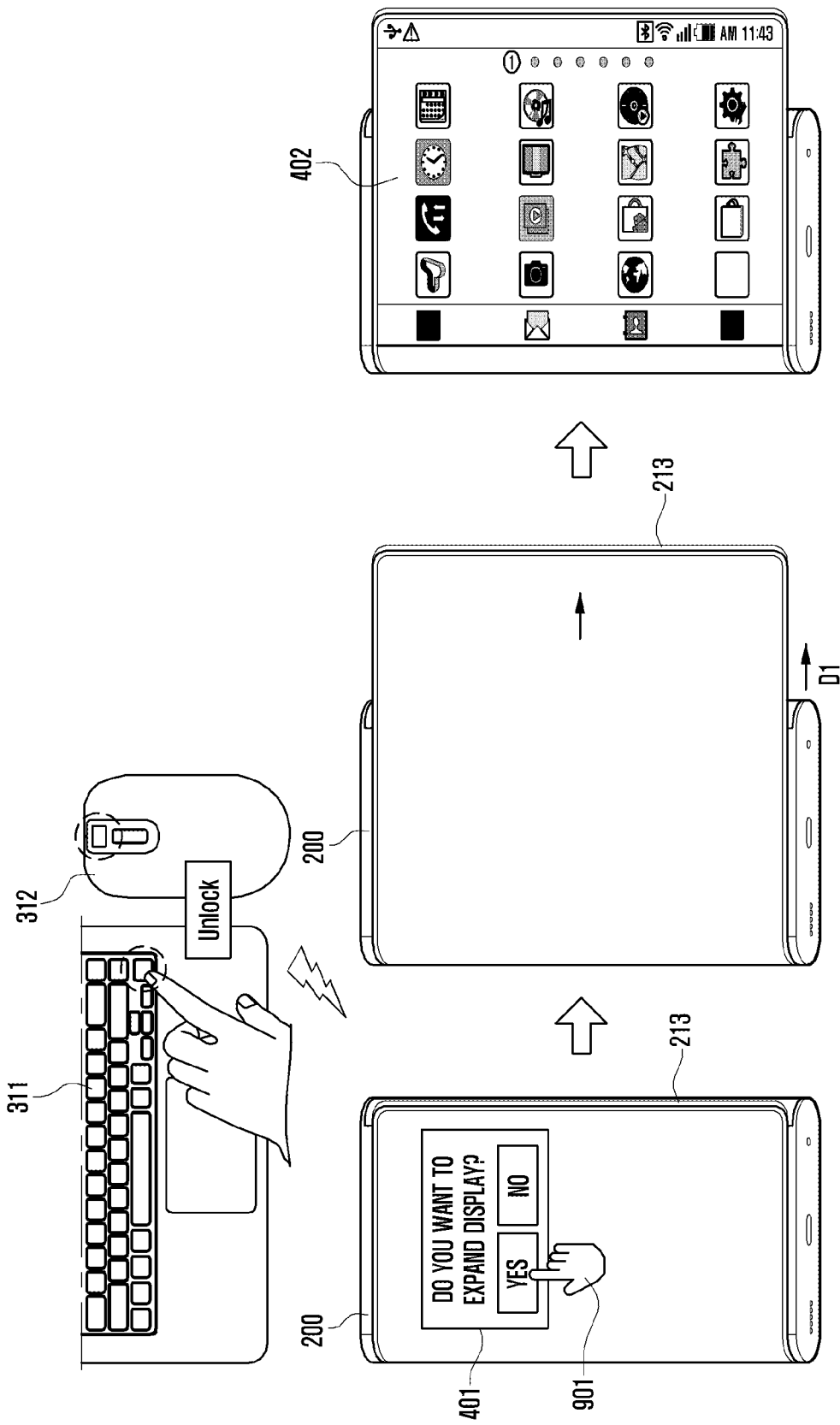
FIG. 4B is a diagram illustrating an example operation of the electronic device according to the flowchart of FIG. 4A according to various embodiments.

FIG. 4B is a diagram illustrating an example operation of the electronic device 200 according to the flowchart of FIG. 4A according to various embodiments.

According to various embodiments, the processor 250 may control the motor 270 so that a second housing (e.g., the second housing 213 in FIG. 2B) is moved in order for the size of the display area to be changed, based on an external electronic device connected to the electronic device 200 is a designated external electronic device and/or whether a change permission input has been received from a user. According to various embodiments, in operation 2100, the processor 250 may check that an external electronic device has been connected to the electronic device 200. According to an embodiment, the external electronic device may include an electronic device (e.g., a Bluetooth keyboard, a Bluetooth mouse, a wearable device, a smart watch and/or a wireless earphone) that is connected to the electronic device 200 over a first network (e.g., a short distance communication network such as Bluetooth).

According to various embodiments, in operation 2200, the processor 250 may determine whether the external electronic device connected to the electronic device 200 is a designated external electronic device.

According to an embodiment, the designated external electronic device may include an external electronic device having a history of having been previously connected to the electronic device 200, an external electronic device designated by a user's configuration, and an external electronic device designated by a manufacturing company upon manufacturing.

According to an embodiment, the designated external electronic device may be a combination of a plurality of external electronic devices. For example, the processor 250 may determine the designated external electronic device has been connected, when a first external electronic device, a second external electronic device and/or a third external electronic device are connected to the electronic device 200. As an example, the processor 250 may determine the designated external electronic device has been connected when two or more external electronic devices, among external electronic devices (e.g., a Bluetooth keyboard, a Bluetooth mouse, and a Bluetooth pen) belonging to a first classification (e.g., an external electronic device performing an input function), are connected. As another example, the processor 250 may determine the designated external electronic device has been connected when two or more external electronic devices, among external electronic devices (e.g., a Bluetooth speaker and a Bluetooth earphone) belonging to a second classification (e.g., an external electronic device performing an acoustic output function), are connected. According to an embodiment, the combination of the plurality of external electronic devices may be configured by a user and/or a manufacturing company upon manufacturing.

According to an embodiment, the processor 250 may identify identification information of the external electronic device connected to the electronic device 200, and may determine whether the external electronic device is a designated external device based on a result of the identification.

According to various embodiments, in operation 2300, the processor 250 may output, to a user, notification that requests a user input for whether to change the size of the display area, in response to the connected external electronic device being the designated external electronic device (operation 2200—Y). For example, the processor 250 may provide the notification in various ways, such as haptic, a sound, and a screen.

According to an embodiment, the processor 250 may display the notification in the display area. For example, the processor 250 may provide the notification by displaying a notification message in the display area and/or displaying a color and/or form of a UI for unlocking differently from a UI having a default state as in the embodiments illustrated in FIGS. 10A, 10B, 10C, 10D, 10E, and 10F.

According to various embodiments, in operation 2400, the processor 250 may determine whether a user input to change the size of the display area is received.

According to an embodiment, the processor 250 may receive, from the user, the user input to change the size of the display area using any one method, among a motion input, a voice input, a touch input, a pattern input, and a fingerprint input. For example, the processor 250 may receive the user input to change the size of the display area through a UI whose color and/or form have been changed as in the examples illustrated in FIGS. 10A, 10B, 10C, 10D, 10E, and 10F.

According to various embodiments, in operation 2500, the processor 250 may control the motor 270 so that the second housing 213 is moved, in response to the user input to change the size of the display area being received (operation 2400—Y). According to an embodiment, the processor 250 may control the motor 270 so that the second housing 213 is moved in an expansion direction (e.g., the first direction D1 in FIG. 2C), in response to a satisfied designated condition being a condition for the expansion of the display area. According to an embodiment, the processor 250 may control the motor 270 so that the second housing 213 is moved in a reduction direction (e.g., the second direction D2 in FIG. 2C), in response to a satisfied designated condition being a condition for the reduction of the display area. According to various embodiments, in operation 2600, the processor 250 may execute an application related to the external electronic device based on the attributes of the connected external electronic device, may display an application screen and/or execute a related mode, and may display a screen corresponding to the related mode.

According to an embodiment, the processor 250 may identify an application related to the external electronic device, based on attributes (e.g., an input device, such as a mouse, a keyboard, or a pencil) of the connected external electronic device. According to an embodiment, the processor 250 may identify a function that is supported by the external electronic device, and may identify an application capable of performing the identified function. For example, the processor 250 may execute an application (e.g., a memo app, a drawing app, or a presentation app) related to the external electronic device, and may display an application screen. According to an embodiment, the executed application may be configured by a user's configuration, may be configured based on information received from the external electronic device and/or may be configured by a manufacturing company upon manufacturing.

According to an embodiment, the processor 250 may identify a mode related to the size of the display area, in response to the size of the display area. According to an embodiment, the processor 250 may execute the mode, and may display a screen corresponding to the mode. For example, the processor 250 may display a screen of a mode (e.g., a wide mode in which an icon is disposed in response to an expanded screen and/or a Dex mode in which an experience similar to a computer can be performed) that provides a user environment according to an expanded screen size, in response to the size of the display area being a maximum.

FIG. 4B is a diagram illustrating an example operation of the electronic device 200 according to the flowchart of FIG. 4A according to various embodiments.

The processor 250 may check that the electronic device 200 is connected to external electronic devices 311 and/or 312 (e.g., operation 2100). According to the embodiment of FIG. 4B, the external electronic devices 311 and/or 312 may be a keyboard 311 and/or a mouse 312 that are connected to the electronic device 200 through short distance communication (e.g., Bluetooth). The processor 250 may determine whether the connected external electronic devices 311 and/or 312 are designated external electronic devices (e.g., operation 2200). For example, the designated external electronic devices may include an external electronic device having a history of having been previously connected to the connection of the electronic device 200, an external electronic device designated by a configuration of a user, and an external electronic device designated by a manufacturing company upon manufacturing. In the present embodiment, the designated external electronic device may be the designated keyboard 311, the designated mouse 312 and/or a combination of the keyboard 311 and the mouse 312.

In response to the connected external electronic devices 311 and 312 being the designated external electronic devices (e.g., operation 2200—Y), the processor 250 may output, to the display, the notification 401 that requests a user input for whether to change the size of the display area (e.g., operation 2300).

In response to a user input 901 to change the size of the display area being received (e.g., operation 2400—Y), the processor 250 may control the motor 270 so that the second housing 213 is moved in a lead-out direction D1. As the second housing 213 is moved, the display area may be expanded.

The processor 250 may switch to a mode (e.g., the wide mode in which an icon is disposed in response to an expanded screen or a mode 402 in which experiences similar to a computer may be performed) corresponding to the expansion of the display area, and may display a screen of the mode.

Although not illustrated in this drawing, the processor 250 may execute an application related to the external electronic devices 311 and/or 312, based on attributes (e.g., an input device) of the connected external devices 311 and/or 312, and may display a screen of an application mode.

Figure 5A:
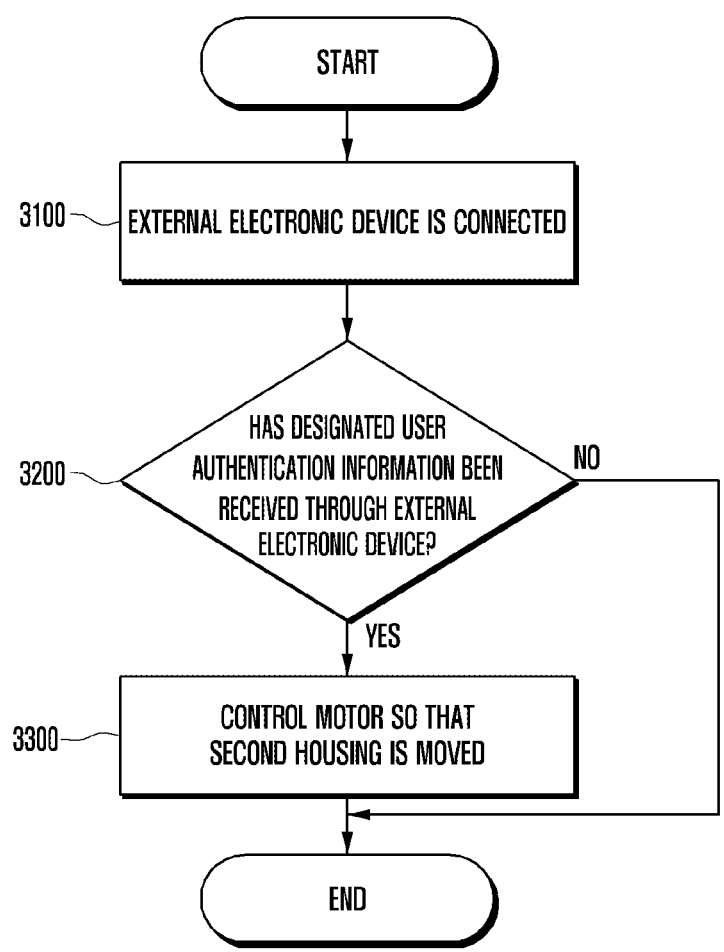
FIG. 5A is a flowchart illustrating an example operation of controlling, by a processor, an electronic device, in response to an external electronic device that has been connected to the electronic device according to receiving a user input for user authentication according to various embodiments.

FIG. 5A is a flowchart illustrating an example operation of controlling, by a processor (e.g., the processor 250 in FIG. 2A), an electronic device (e.g., the electronic device 200 in FIG. 2A), in response to an external electronic device that has been connected to the electronic device (e.g., the electronic device 200 in FIG. 2A) receiving a user input for user authentication according to various embodiments.

FIG. 5B is a diagram illustrating an example operation of the electronic device 200 according to the flowchart of FIG. 5A according to various embodiments.

According to various embodiments, the processor 250 may control the motor 270 so that a second housing (e.g., the second housing 213 in FIG. 2B) is moved, based on designated user authentication information being received through an external electronic device connected to the electronic device 200.

According to various embodiments, in operation 3100, the processor 250 may check that an external electronic device has been connected to the electronic device 200. According to various embodiments, the external electronic device may include an electronic device (e.g., a Bluetooth keyboard, a Bluetooth mouse, a wearable device, a smart watch and/or a wireless earphone) that is connected to the electronic device 200 over a first network (e.g., a short distance communication network such as Bluetooth).

According to various embodiments, in operation 3200, the processor 250 may determine whether designated user authentication information has been received through the external electronic device.

According to an embodiment, the processor 250 may receive user identification and/or authentication (e.g., bio information, such as an iris, face, or fingerprint of a user, a password input and/or a pattern input) through the external electronic device, and may determine whether the received information of the user is designated user information.

According to various embodiments, in operation 3300, the processor 250 may control the motor 270 so that the second housing 213 is moved in response to the designated user authentication information being received through the external electronic device (operation 3200—Y). According to an embodiment, the processor 250 may control the motor 270 so that the second housing 213 is moved in an expansion direction (e.g., the first direction D1 in FIG. 2C), in response to a satisfied designated condition being a condition for the expansion of the display area. According to an embodiment, the processor 250 may control the motor 270 so that the second housing 213 is moved in a reduction direction (e.g., the second direction D2 in FIG. 2C), in response to a satisfied designated condition being a condition for the reduction of the display area.

FIG. 5B is a diagram illustrating an example operation of the electronic device 200 according to the flowchart of FIG. 5A according to various embodiments.

The processor 250 may check that the electronic device 200 is connected to an external electronic device 320 (e.g., operation 3100). According to the embodiment of FIG. 5B, the external electronic device 320 may be an external electronic device (e.g., a wearable device and/or a smart watch) that is connected to the electronic device 200 over a short distance network (e.g., Bluetooth). The processor 250 may determine whether designated user authentication information has been received through the connected external electronic device 320 (e.g., operation 3200). For example, the processor 250 may receive user fingerprint information 902 that is input through the external electronic device 320, and may determine whether the user fingerprint information is designated fingerprint information. In response to the user fingerprint information 902 being the designated fingerprint information, the processor 250 may control the motor 270 so that the second housing 213 is moved in a lead-out direction D1 (e.g., operation 3300). As the second housing 213 is moved, the display area may be expanded.

Figure 6A:
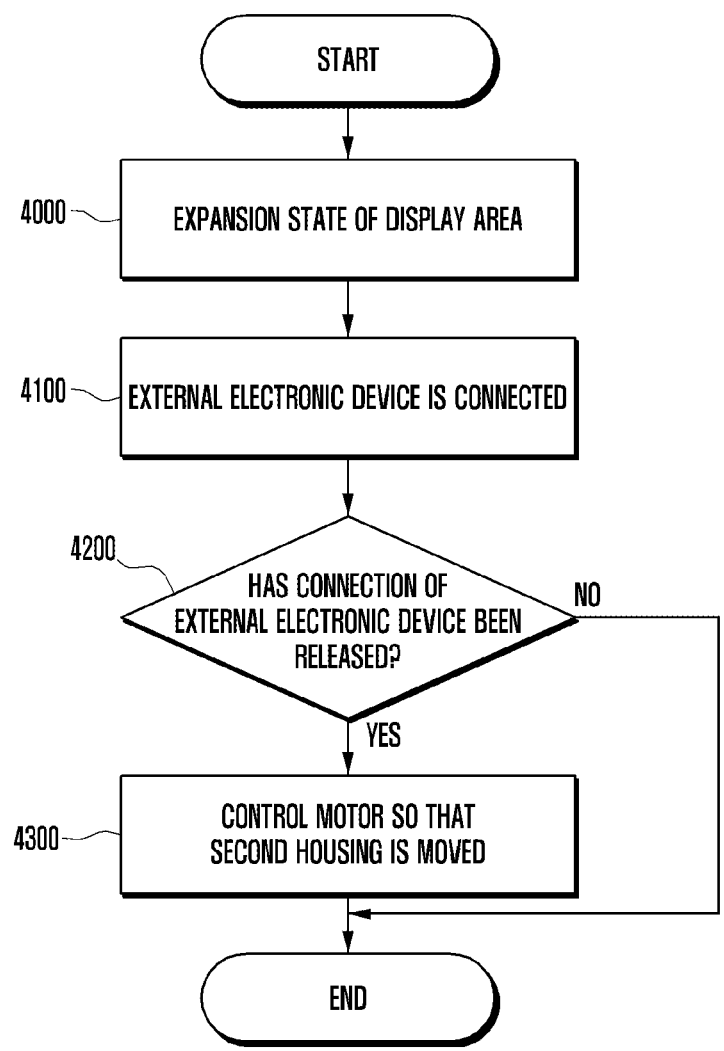
FIG. 6A is a flowchart illustrating an example operation of controlling, by a processor, an electronic device, in response to an external electronic device that has been connected to the electronic device according to switching to a connection release state according to various embodiments.

FIG. 6A is a flowchart illustrating an example operation of controlling, by a device 200 in FIG. 2A), in response to an external electronic device that has been connected to the electronic device 200 switching to a connection release state according to various embodiments. FIG. 6B is a diagram illustrating an example operation of the electronic device 200 according to the flowchart of FIG. 6A according to various embodiments.

According to various embodiments, the processor 250 may control the motor 270 so that a second housing (e.g., the second housing 213 in FIG. 2B) is moved, based on the external electronic device connected to the electronic device 200 switching to the connection release state.

According to various embodiments, in operation 4000, the processor 250 may identify that the display area is in an expansion state. According to an embodiment, the state in which the display area has been expanded may include the state in which the second housing 213 has been led out to a maximum extent and/or the state in which the second housing 213 has been partially led out.

According to various embodiments, in operation 4100, the processor 250 may check that an external electronic device has been connected to the electronic device 200. According to various embodiments, the external electronic device may include an electronic device (e.g., a Bluetooth keyboard, a Bluetooth mouse, a wearable device, a smart watch, or a wireless earphone) that is connected to the electronic device 200 over a first network (e.g., a short distance communication network such as Bluetooth).

According to various embodiments, in operation 4200, the processor 250 may determine whether the connection of the external electronic device with the electronic device 200 has been released. For example, the processor 250 may determine that the connection with the external electronic device has been released as the external electronic device is moved to a distant location from the electronic device 200 and short distance communication is disconnected.

According to an embodiment, in operation 4200, the processor 250 may operate in the same way as that the connection with the external electronic device has been released, in response to the intensity of a signal received from the external electronic device being designated intensity or less. For example, the processor 250 may operate in the same way as a case in which the connection with the external electronic device has been released, in response to the intensity of a signal (e.g., a Bluetooth signal) received from the external electronic device being designated intensity or less.

According to various embodiments, in operation 4300, the processor 250 may control the motor 270 so that the second housing 213 is moved, in response to the connection of the external electronic device with the electronic device 200 being released (operation 4200—Y). According to an embodiment, the processor 250 may control the motor 270 so that the second housing 213 is moved in a reduction direction (e.g., the second direction D2 in FIG. 2C), in response to a satisfied designated condition being a condition for the reduction of the display area.

FIG. 6B is a diagram illustrating an example operation of the electronic device 200 according to the flowchart of FIG. 6A according to various embodiments.

The processor 250 may identify that the electronic device 200 is in the state in which the display area has been expanded (e.g., operation 4000). Furthermore, the processor 250 may check that the electronic device 200 is connected to the external electronic device 320 (e.g., operation 4100). According to the embodiment of FIG. 6B, the external electronic device 320 may be a wearable device that is connected to the electronic device 200 through Bluetooth communication and which may be worn on a user's body. The processor 250 may determine whether the connection of the connected external electronic device 320 with the electronic device 200 has been released (e.g., operation 4200). For example, as a user who has worn the external electronic device 320 moves to a distant location from the electronic device 200, Bluetooth communication may be disconnected. The processor 250 may determine that the connection with the external electronic device 320 has been released. In response to the connection of the external electronic device 320 being released, the processor 250 may control the motor 270 so that the second housing 213 is moved in the lead-in direction D2 (e.g., operation 4300). As the second housing 213 is moved, the display area may be reduced.

Figure 7A:
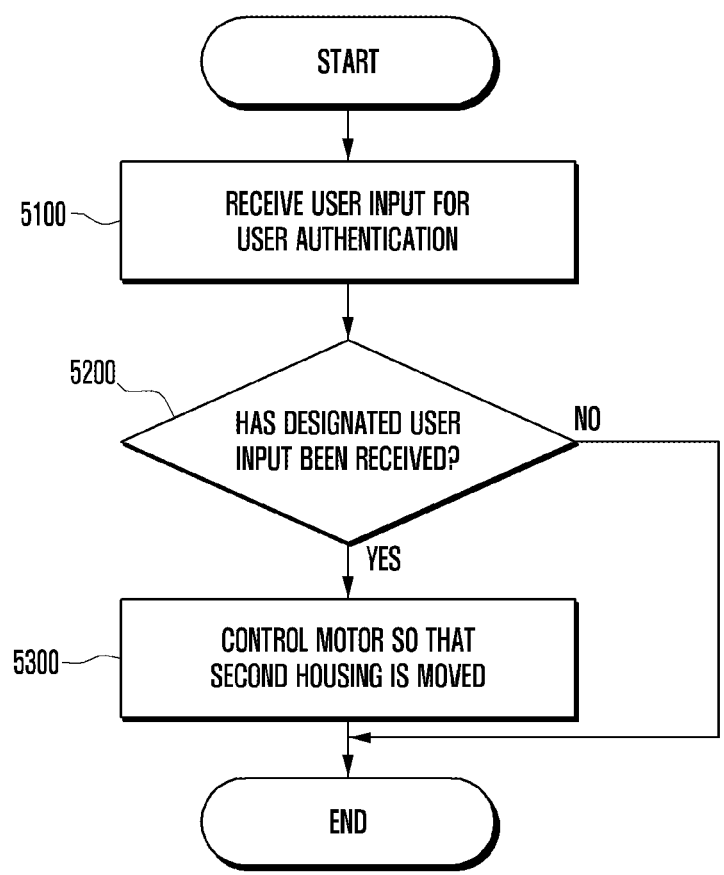
FIG. 7A is a flowchart illustrating an example operation of controlling, by a processor, an electronic device, in response to the electronic device receiving a user input for user authentication according to various embodiments.

FIG. 7A is a flowchart illustrating an example operation of controlling, by a device 200 in FIG. 2A, in response to the electronic device (e.g., the electronic device 200 in FIG. 2A) receiving a user input for user authentication according to various embodiments.

Figure 7B:
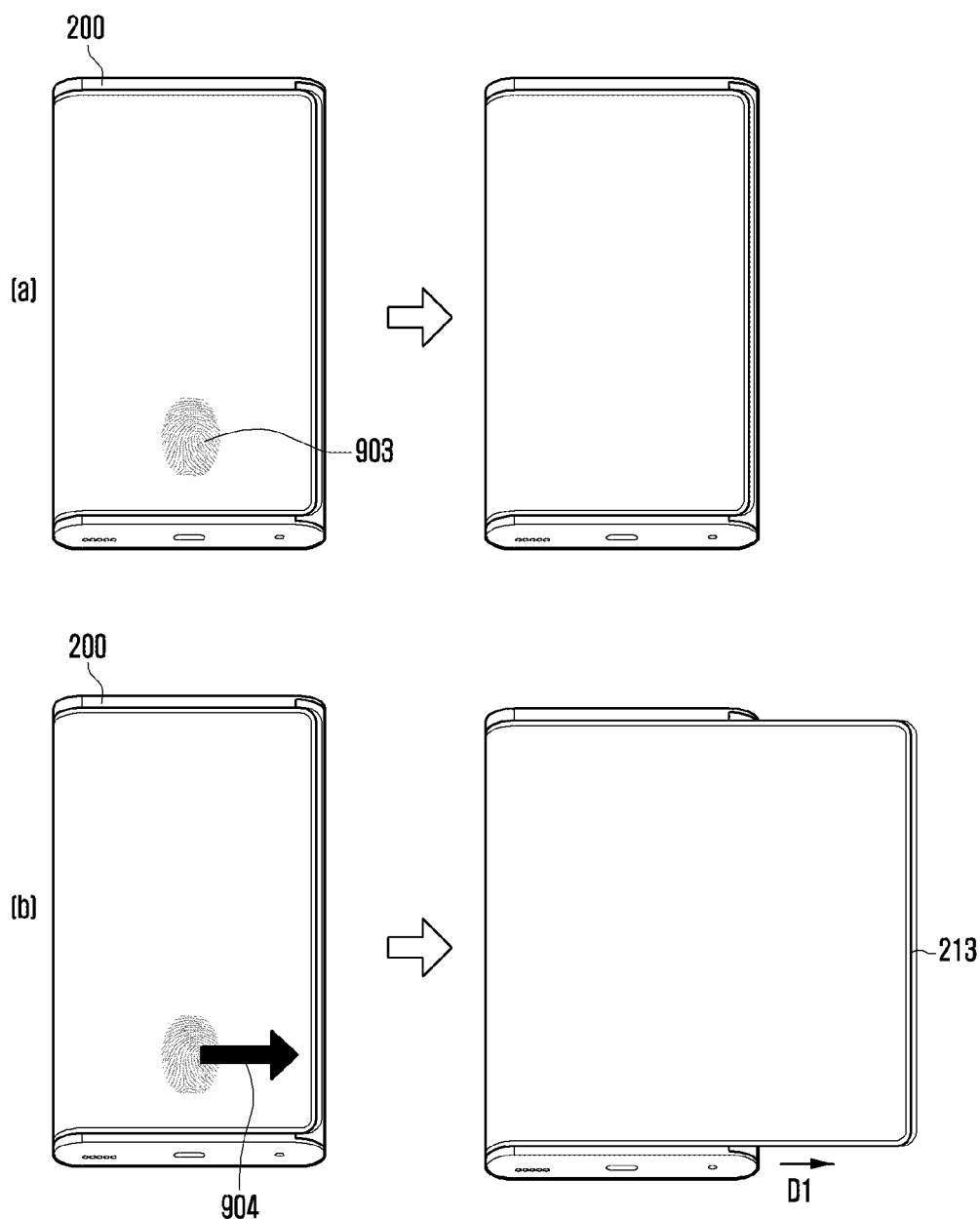
FIGS. 7B, 7C, and 7D are diagrams illustrating examples of operations of the electronic device according to the flowchart of FIG. 7A according to various embodiments.
Figure 7C:
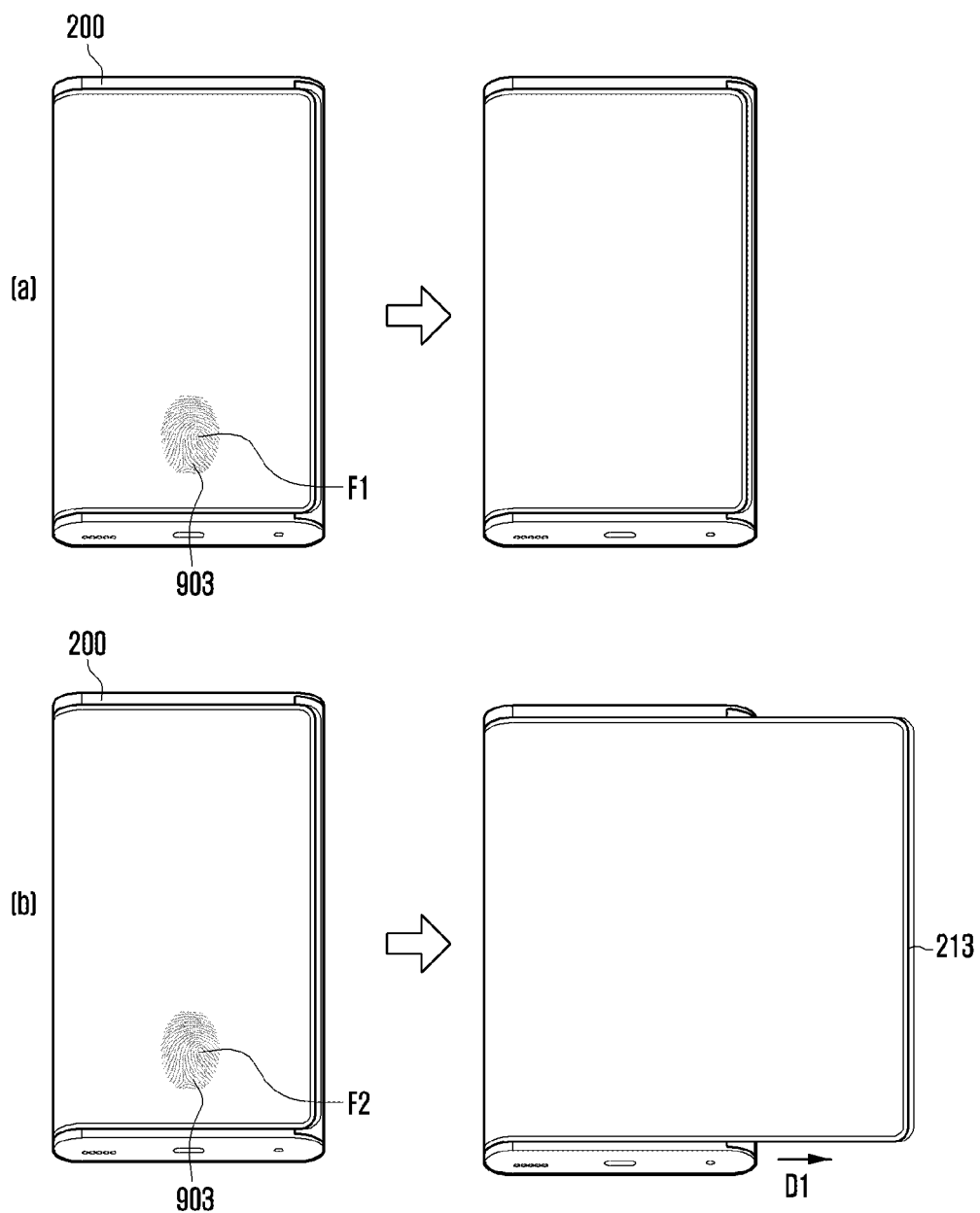
Figure 7D:
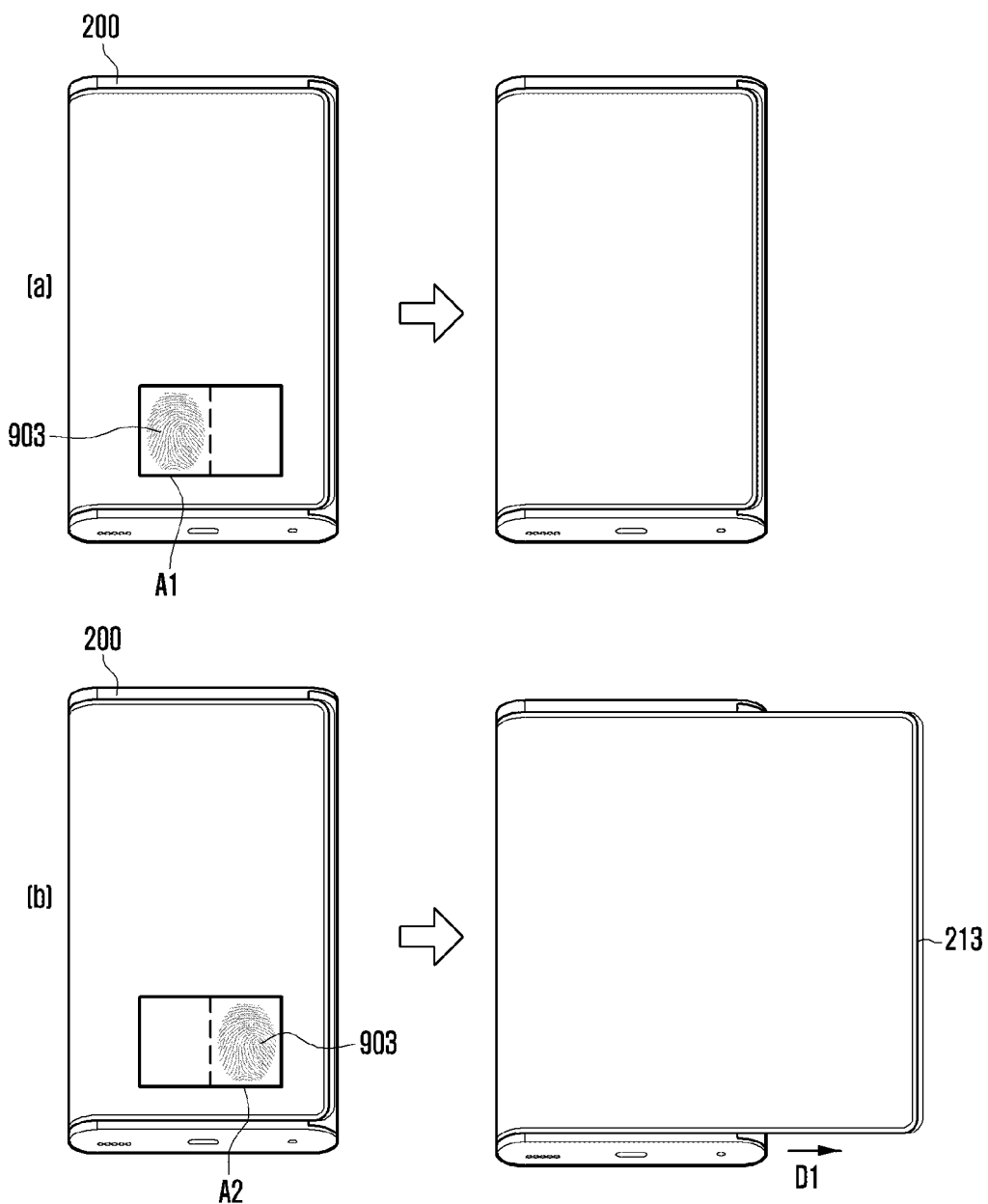

FIGS. 7B, 7C, and 7D are diagrams illustrating examples of operations of the electronic device 200 according to the flowchart of FIG. 7A according to various embodiments.

According to various embodiments, the processor 250 may control the motor 270 so that a second housing (e.g., the second housing 213 in FIG. 2B) is moved, based on the electronic device 200 receiving a user input for user authentication.

According to various embodiments, in operation 5100, the processor 250 may identify that a user input for user authentication is input to the electronic device 200. According to an embodiment, the user input may include at least one of the input of bio information, such as an iris, face, or fingerprint of a user, a password input, and a pattern input.

According to various embodiments, in operation 5200, the processor 250 may determine whether the user input is a designated user input. According to an embodiment, whether the user input is a designated operation input may be determined. For example, a designated operation input of a user may include an operation of the user swiping his or her finger from left to right on the display. According to an embodiment, the processor 250 may determine whether the user input is designated bio information (e.g., the fingerprint of a specific finger, such as an index finger fingerprint or middle finger fingerprint of a user). According to an embodiment, the processor 250 may determine whether a fingerprint is input to an area in which a user input has been designated. For example, the fingerprint being input to the designated area may include that a user's fingerprint is input to some area at a right end of the display area. The designated user input may be determined by a user's configuration or may be configured by a manufacturing company upon manufacturing.

According to various embodiments, in operation 5300, the processor 250 may control the motor 270 so that the second housing 213 is moved, in response to the user input being the designated user input (operation 5200—Y). According to an embodiment, the processor 250 may control the motor 270 so that the second housing 213 is moved in an expansion direction (e.g., the first direction D1 in FIG. 2C), in response to a satisfied designated condition being a condition for the expansion of the display area. According to an embodiment, the processor 250 may control the motor 270 so that the second housing 213 is moved in a reduction direction (e.g., the second direction D2 in FIG. 2C), in response to a satisfied designated condition being a condition for the reduction of the display area.

FIG. 7B is a diagram illustrating an example operation of the electronic device 200 according to the flowchart of FIG. 7A according to various embodiments.

The processor 250 may identify that user inputs 903 and/or 904 are received (e.g., operation 5100).

The processor 250 may determine whether the user input is an operation of a user swiping his or her finger from left to right on the display (e.g., operation 5200). With reference to (a), the processor 250 may receive a user input (e.g., the user input 903 that performs fingerprint recognition), and may identify that the user input does not satisfy a condition (e.g., a swipe input) for a designated operation input. The processor 250 may control the motor 270 to not operate so that the second housing 213 is moved in the lead-out direction D1, in response to the user input not satisfying the condition for the designated operation input. In this case, the size of the display area may not be changed. With reference to (b), the processor 250 may receive a user input (e.g., the user input 904 that performs a swipe input), and may identify that the user input 904 satisfies a condition (e.g., a swipe from left to right) for a designated operation input. The processor 250 may control the motor 270 so that the second housing 213 is moved in the lead-out direction D1, in response to the user input satisfying the condition for the designated operation input. In this case, the size of the display area may be expanded.

FIG. 7C is a diagram illustrating an example operation of the electronic device 200 according to the flowchart of FIG. 7A according to various embodiments.

The processor 250 may configure bio information capable of changing (e.g., expanding and/or reducing) the size of the display area, among a plurality of types of bio information that have been previously stored in memory (e.g., the memory 130 in FIG. 1), based on a user's configuration. The processor 250 may change the size of the display area based on whether bio information (e.g., a user's fingerprint) of a user is designated bio information. For example, the processor 250 may change the size of the display area in response to some bio information, among a plurality of types of bio information that have been stored in the memory 130, being received. The processor 250 may also differently change the size of the display area for each of pieces of some bio information. For example, the processor 250 may expand the size of the display area to a maximum size in response to first bio information being received, and may expand only some of the size of the display area in response to second bio information being received. The processor 250 may maintain the size of the display area in response to other some bio information, among the plurality of types of stored bio information, being received. The processor 250 may identify that a user input (e.g., fingerprint recognition 903) is received (e.g., operation 5100). The processor 250 may determine whether the input fingerprint is a designated fingerprint F2 capable of changing the size of the display area (e.g., operation 5200). In the example of (a), a first fingerprint F1 is input, and a condition for a designated user input is not satisfied. In the example of (b), the second fingerprint F2 is input, and a condition for a designated user input may be satisfied. In the example of (a) in which the condition is not satisfied, the processor 250 may control the motor 270 to not operate so that the size of the display area is not changed. In the example of (b) in which the condition is satisfied, the processor 250 may control the motor 270 so that the second housing 213 is moved in the lead-out direction D1, so that the size of the display area may be expanded.

FIG. 7D is a diagram illustrating an example operation of the electronic device 200 according to the flowchart of FIG. 7A according to various embodiments.

The processor 250 may identify that the user input 903 is received (e.g., operation 5100).

The processor 250 may determine whether the user input 903 has been input to a designated area (e.g., a second area A2) (e.g., operation 5200).

With reference to (a), the processor 250 may receive a user input (e.g., the fingerprint recognition 903 in the first area A1), and may identify that the user input does not satisfy a condition for a designated user input (e.g., the reception of the user input to the second area A2). The processor 250 may control the motor 270 to not operate so that the second housing 213 is moved in the lead-out direction D1, in response to the user input not satisfying the condition for the designated operation input. With reference to (b), the processor 250 may receive a user input (e.g., the recognition fingerprint 903 in the second area A2), and may identify that the user input satisfies the condition. The processor 250 may control the motor 270 so that the second housing 213 is moved in the lead-out direction D1, in response to the user input satisfying the condition for the designated operation input. In this case, the size of the display area may be expanded.

Figure 8A:
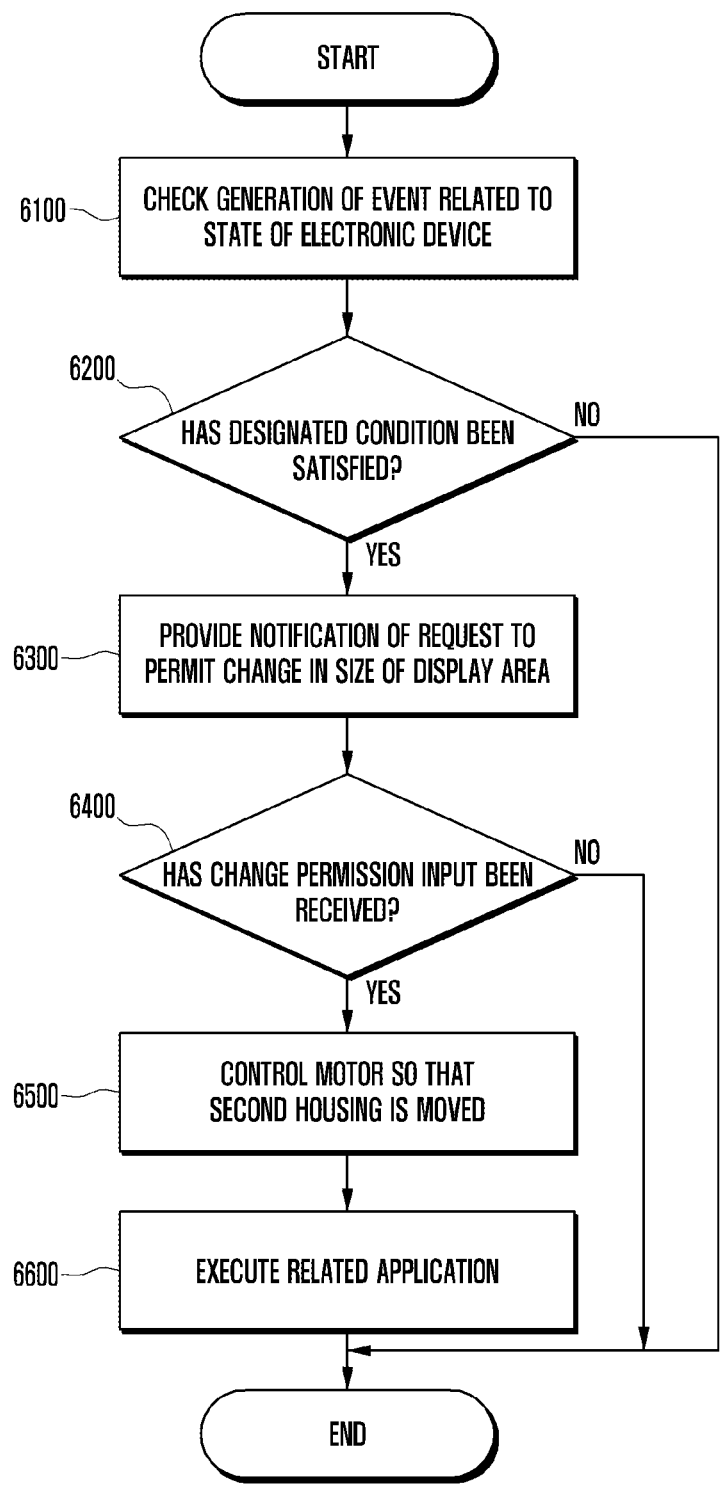
FIG. 8A is a flowchart illustrating an example operation of controlling, by a processor, an electronic device, in response to an event related to a state of the electronic device satisfying a designated condition according to various embodiments.

FIG. 8A is a flowchart illustrating an example operation of controlling, by a processor (e.g., the processor 250 in FIG. 2A), an electronic device (e.g., the electronic device 200 in FIG. 2A), in response to an event related to a state of the electronic device 200 satisfying a designated condition according to various embodiments.

FIGS. 8B, 8C, 8D, and 8E are diagrams illustrating examples of operations of the electronic device 200 according to the flowchart of FIG. 8A according to various embodiments.

According to various embodiments, the processor 250 may control the motor 270 so that a second housing (e.g., the second housing 213 in FIG. 2B) is moved, based on whether an event related to a state of the electronic device 200 satisfies a designated condition and/or whether a change permission input has been obtained from a user.

According to various embodiments, in operation 6100, the processor 250 may check that an event related to a state of the electronic device 200 is generated. According to an embodiment, the event may include that the electronic device 200 is connected to a network (e.g., Wi-Fi). According to an embodiment, the event may include that a position sensor (e.g., a GPS) of the electronic device 200 measures a location of the electronic device 200. According to an embodiment, the event may include that a message is generated from an application.

According to various embodiments, in operation 6200, the processor 250 may determine whether the event satisfies a designated condition.

According to an embodiment, the designated condition may include a condition related to whether a network (e.g., Wi-Fi) to which the electronic device 200 has been connected is a designated network. For example, the processor 250 may determine whether identification information of a network with which the electronic device 200 communicates is designated identification information.

According to an embodiment, the designated condition may include a condition related to whether a location of the electronic device 200 measured by a position sensor (e.g., GPS) is a designated location. For example, the processor 250 may determine whether GPS coordinates (longitude and latitude) measured by the position sensor are designated GPS coordinates.

According to an embodiment, the designated condition may include a condition related to whether a current time is included in a designated time zone. For example, the processor 250 may check a current time, and may determine whether the checked current time is included in a designated time zone.

According to an embodiment, the designated condition may include a condition related to whether a message generated by an application is a designated message. For example, the designated condition may include that a message (e.g., SMS, MMS, or RCS) generated by an SMS application is a designated message (e.g., a message received from a designated sender), a message (e.g., SMS, MMS, or RCS) received from an external electronic device is a designated message (e.g., a message received from a designated external electronic device), or a message (e.g., application notification) transmitted by an application in a framework layer is a designated message. For example, the processor 250 may check whether a message generated by an application (e.g., an SNS application or a video sharing platform) is a designated message (e.g., SNS upload notification of a specific account or video upload of a specific account).

According to an embodiment, the designated condition may include a condition related to that a message generated by an application includes specific contents. For example, the designated condition may include that the address of a specific webpage is included in the contents of a generated message.

The designated condition may be configured by a user's configuration, may be configured by a manufacturing company upon manufacturing, or may be configured by a configuration of an application installed in the electronic device 200.

According to various embodiments, in operation 6300, the processor 250 may output, to a user, notification that requests a user input for whether to change the size of the display area, in response to the event satisfying the designated condition (operation 6200—Y). For example, the processor 250 may provide the notification in various ways, such as haptic, a sound, and a screen.

According to an embodiment, the processor 250 may display the notification in the display area. For example, the processor 250 may display a notification message in the display area or may provide the notification by displaying a color and/or form of a UI for unlocking differently from a UI having a default state as in embodiments illustrated in FIGS. 10A, 10B, 10C, 10D, 10E, and 10F.

According to various embodiments, in operation 6400, the processor 250 may determine that a user input to change the size of the display area is received.

According to an embodiment, the processor 250 may receive, from the user, the user input to change the size of the display area using any one method, among a motion input, a voice input, a touch input, a pattern input, and a fingerprint input. For example, the processor 250 may receive the user input to change the size of the display area through a UI whose color and/or form have been changed, as in examples illustrated in FIGS. 10A, 10B, 10C, 10D, 10E, and 10F.

According to an embodiment, the processor 250 may receive a user input for connecting to a specific webpage and/or changing the size of the display area, in response to the address of a specific webpage being included in the contents of a message generated by an application.

According to various embodiments, in operation 6500, the processor 250 may control the motor 270 so that the second housing 213 is moved, in response to the user input to change the size of the display area being received (operation 6400—Y).

According to an embodiment, the processor 250 may control the motor 270 so that the second housing 213 is moved in an expansion direction (e.g., the first direction D1 in FIG. 2C), in response to the satisfied designated condition being a condition for the expansion of the display area. According to an embodiment, the processor 250 may control the motor 270 so that the second housing 213 is moved in a reduction direction (e.g., the second direction D2 in FIG. 2C), in response to the satisfied designated condition being a condition for the reduction of the display area.

According to various embodiments, in operation 6600, the processor 250 may execute an application related to the event based on the attributes of the event, and may display an application screen. The processor 250 may execute an application (e.g., a video application or an SNS application) related to the event, based on attributes (e.g., a specific place, a specific time, or a specific application message) of a connected event, and may display an application screen. According to an embodiment, the executed application may be configured by a user's configuration, may be configured by a manufacturing company upon manufacturing, or may be configured by a configuration of an application installed in the electronic device 200.

Figure 8B:
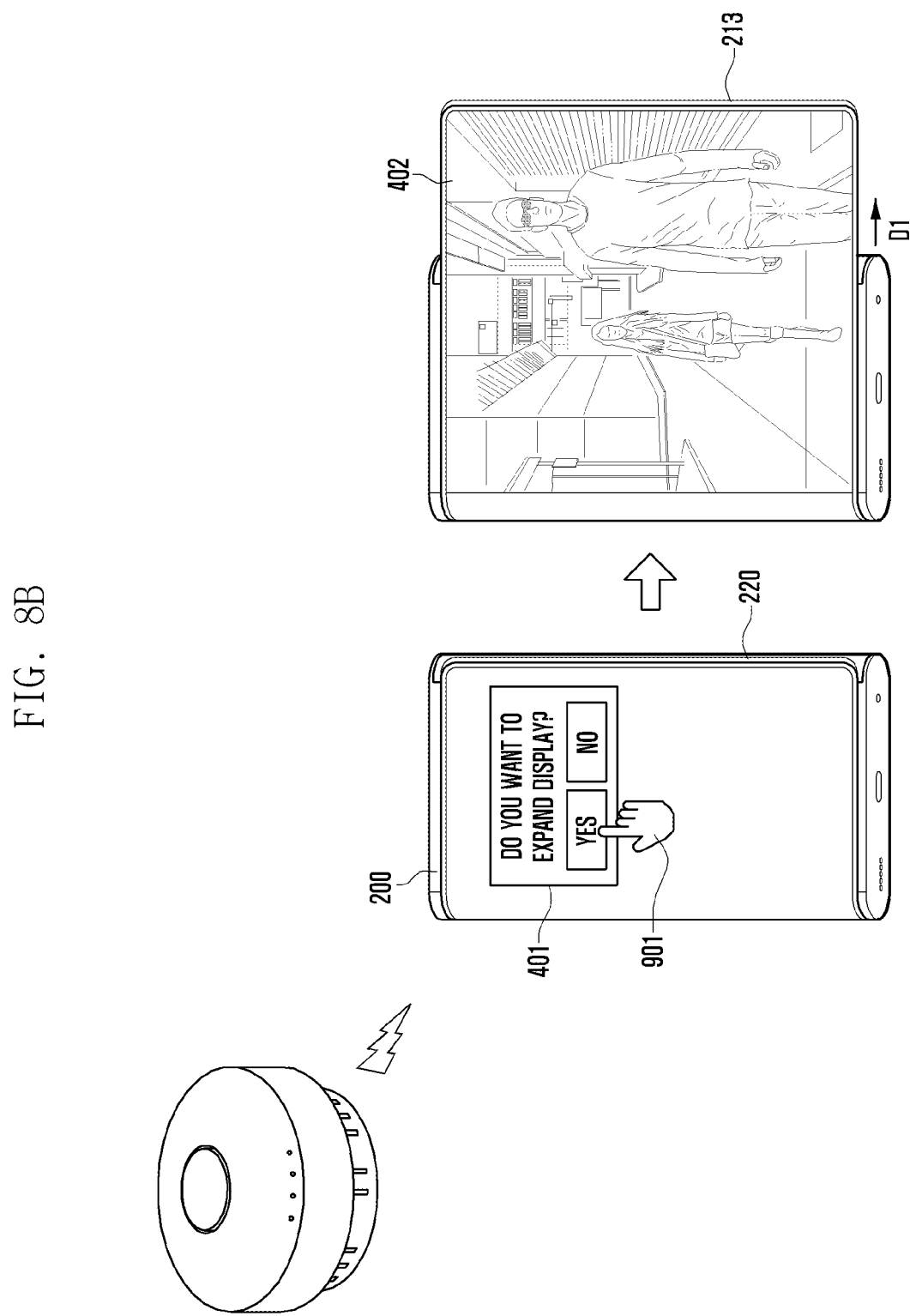
FIGS. 8B, 8C, 8D, and 8E are diagrams illustrating examples of operations of the electronic device according to the flowchart of FIG. 8A according to various embodiments.

FIG. 8B is a diagram illustrating an example operation of the electronic device 200 according to the flowchart of FIG. 8A according to various embodiments. The processor 250 may check that the electronic device 200 is connected to a network (e.g., Wi-Fi) (e.g., operation 6100). The processor 250 may determine whether the network to which the electronic device 200 has been connected is a designated network (e.g., operation 6200). For example, the processor 250 may determine whether identification information of the network is identification information of the designated network. In response to the network being the designated network (e.g., operation 6200—Y), the processor 250 may output, to the display, notification 401 that requests a user input for whether to change the size of the display area (e.g., operation 6300). In response to a user input 901 to change the size of the display area being received (e.g., operation 6400—Y), the processor 250 may control the motor 270 so that the second housing 213 is moved in a lead-out direction D1. As the second housing 213 is moved, the display area may be expanded. The processor 250 may execute an application (e.g., the playback of an application for advertising video) related to attributes (e.g., a place where Wi-Fi is connected) of the connected network, based on the attributes of the network, and may display an application screen.

Figure 8C:
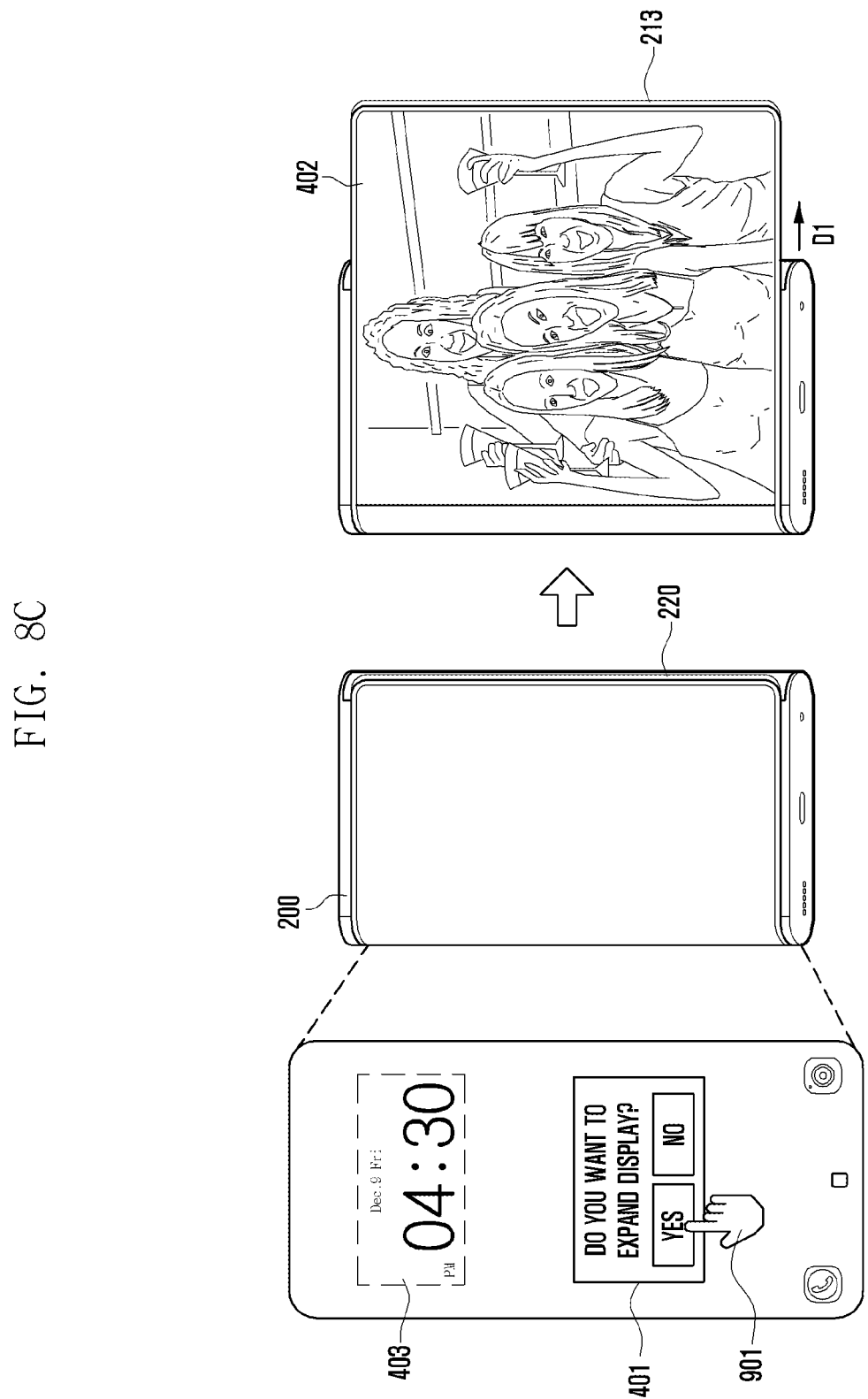

FIG. 8C is a diagram illustrating an example operation of the electronic device 200 according to various embodiments. The processor 250 may determine whether a current time 403 of the electronic device 200 is a designated time (e.g., operation 6200). According to an embodiment, the designated time may be the time previously set by a user. In response to the current time 403 of the electronic device 200 being the designated time (e.g., operation 6200—Y), the processor 250 may output, to the display, the notification 401 that requests a user input for whether to change the size of the display area (e.g., operation 6300). In response to the user input 901 to change the size of the display area being received (e.g., operation 6400—Y), the processor 250 may control the motor 270 so that the second housing 213 is moved in a lead-out direction D1. As the second housing 213 is moved, the display area may be expanded. The processor 250 may execute an application (e.g., an application for the watching of real-time video) the execution of which has been previously scheduled, and may display an application screen.

Figure 8D:
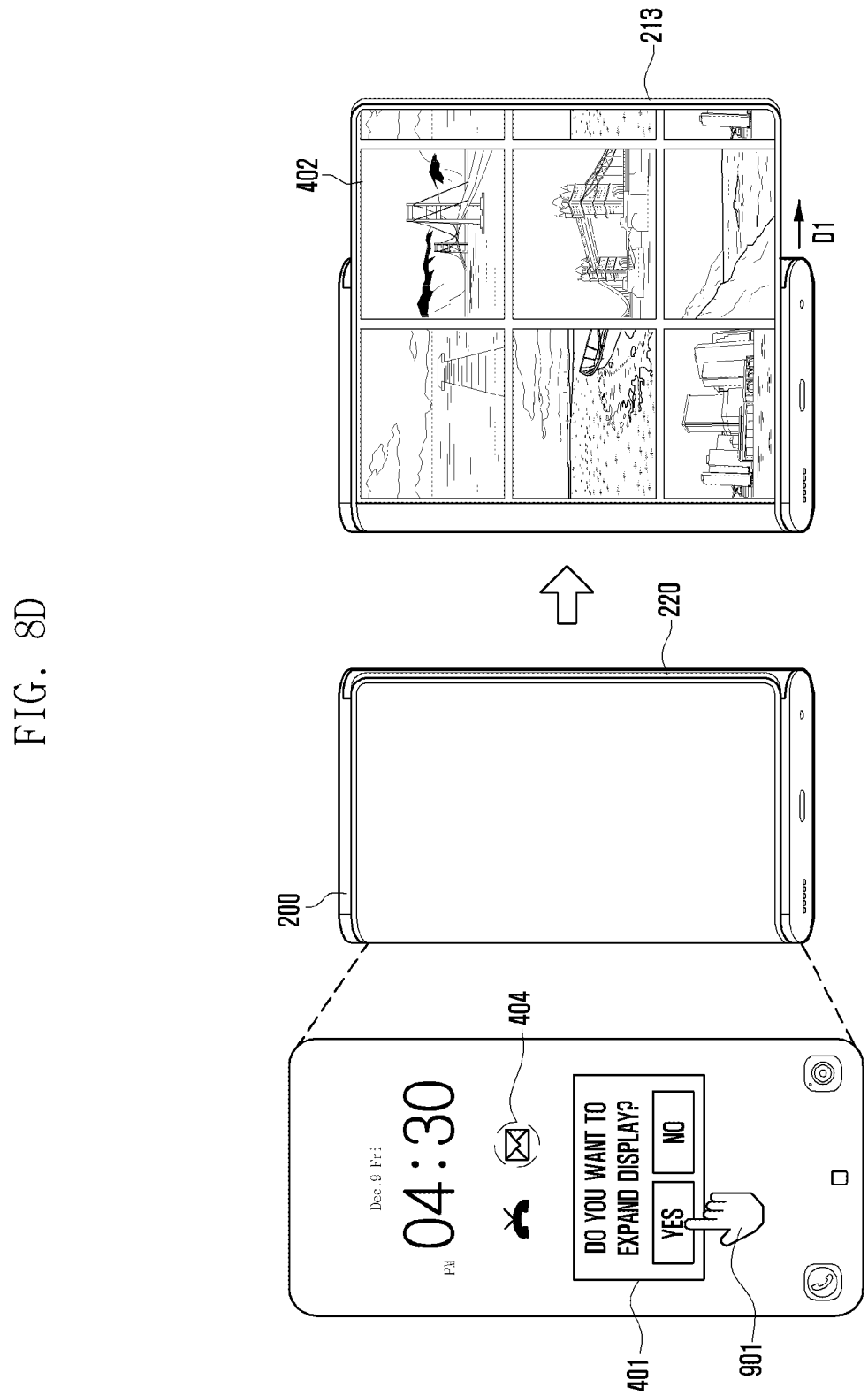

FIG. 8D is a diagram illustrating an example operation of the electronic device 200 according to various embodiments. The processor 250 may check that a message 404 is generated from an application (e.g., an SNS application) (e.g., operation 6100). The processor 250 may determine whether the message 404 generated from the application is a designated message (e.g., post upload notification of an SNS-specific account, operation 6200). According to an embodiment, the designated message may be a message that has been previously configured by a user. In response to the generated message 404 being the designated message (e.g., operation 6200—Y), the processor 250 may output, to the display, the notification 401 that requests a user input for whether to change the size of the display area (e.g., operation 6300). In response to the user input 901 to change the size of the display area being received (e.g., operation 6400—Y), the processor 250 may control the motor 270 so that the second housing 213 is moved in a lead-out direction D1. As the second housing 213 is moved, the display area may be expanded. The processor 250 may execute an application (e.g., an SNS application or an application for the playback of video) that has generated the message, based on attributes (e.g., post upload notification of an SNS-specific account) of the application message, and may display an application screen (e.g., a post list 402 of an SNS-specific account).

Figure 8E:
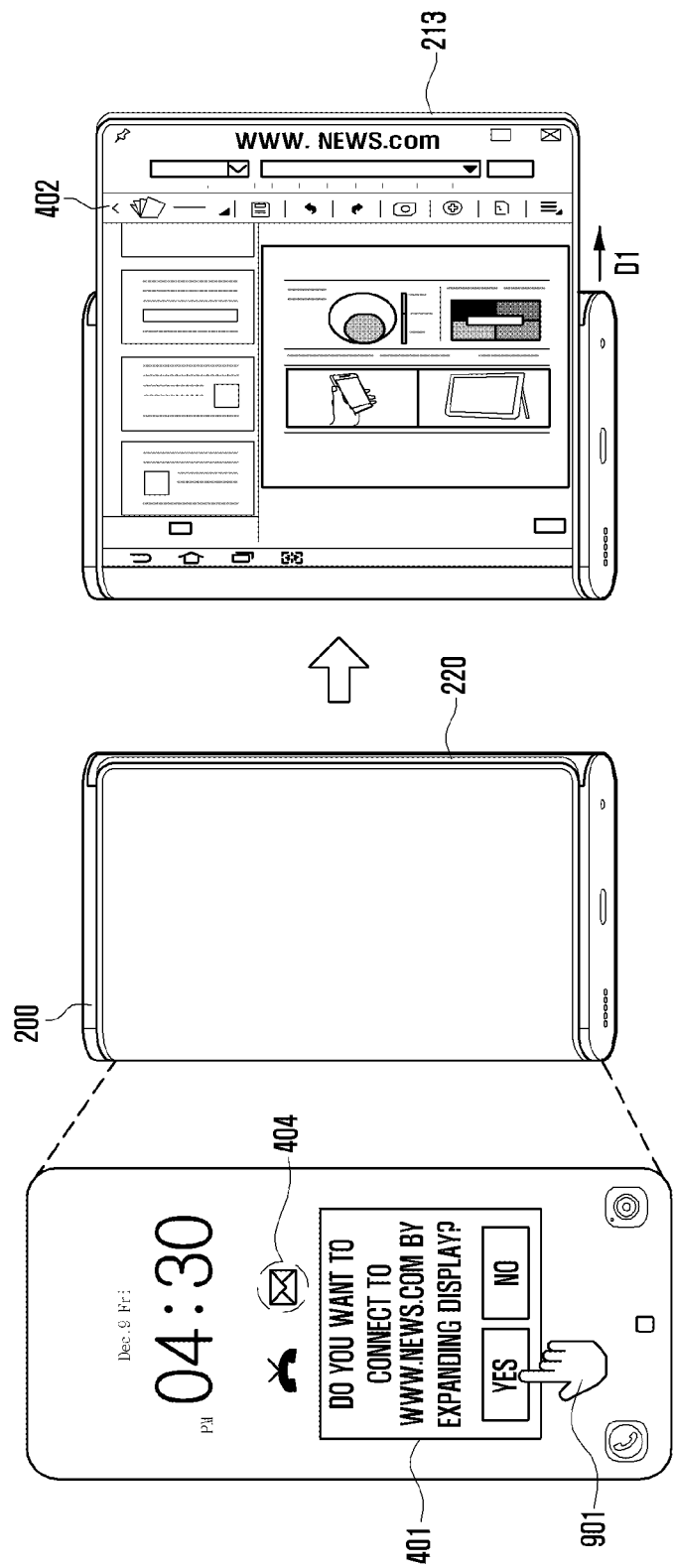

FIG. 8E is a diagram illustrating an example operation of the electronic device 200 according to various embodiments. The processor 250 may check that a message 404 is generated by an application (e.g., an SMS application) (e.g., operation 6100). The processor 250 may determine whether specific contents have been included in the message 404 generated by the application (e.g., a message including a website address, operation 6200). In response to the specific contents being included in the generated message 404 (e.g., operation 6200—Y), the processor 250 may output, to the display, the notification 401 that requests a user input for whether to connect to a website and/or to change the size of the display area (e.g., operation 6300). In response to a user input 901 to change the size of the display area being received (e.g., operation 6400—Y), the processor 250 may control the motor 270 so that the second housing 213 is moved in a lead-out direction D1. As the second housing 213 is moved, the display area may be expanded. The processor 250 may execute an application which may be connected to the website, based on contents (e.g., the address of a specific website) included in the application message, and may display a corresponding website screen.

FIG. 9 is a diagram illustrating an example operation of the electronic device 200 according to various embodiments.

According to an embodiment, a processor (e.g., the processor 250 in FIG. 2A) may identify a movement command (e.g., 903) of the second housing 213, and may determine whether there is an obstacle to the movement of the second housing 213 before controlling a motor (e.g., the motor 270 in FIG. 2A) so that the second housing 213 is moved. The presence of the obstacle to the movement of the second housing 213 may refer, for example, to the second housing 213 not being moved by a designated length due to an external object. The processor 250 may check a movement distance of the second housing 213, in response to the motor 270 being controlled so that the second housing 213 is moved by the designated length. The processor 250 may determine that there is an obstacle to the movement of the second housing 213, in response to the movement distance of the second housing 213 being smaller than the designated length by a preset value or more.

According to various embodiments, a case in which there is an obstacle to the movement of the second housing 213 may include a case in which there is an obstacle when the second housing 213 is moved in the first direction D1 because there is the obstacle in the first direction D1, as in a case in which a user grasps (905) the electronic device 200 in the first direction D1 or a case in which a surface of the second housing 213 of the electronic device 200 comes into contact with the ground.

According to various embodiments, the sensor module 240, including a motor sensor that detects a load equal to or greater than given torque of the motor 270, a pressure sensor that detects pressure that is applied to the electronic device 200, a grip sensor that detects whether the electronic device 200 is grasped and/or a distance sensor that detects a distance between the second housing 213 of the electronic device 200 and an obstacle, may detect whether an obstacle is present in the movement of the second housing 213. The sensor module 240 may transmit, to the processor 250, data indicating that there is the obstacle to the movement of the second housing 213, in response to the obstacle being detected in the movement of the second housing 213. The processor 250 may determine whether the obstacle is present based on the data transmitted by the sensor module 240. The processor 250 may not control an operation of the motor 270, in response to the obstacle being determined to be present in the movement of the second housing 213.

According to various embodiments, the processor 250 may determine whether an obstacle to the movement of the second housing 213 has been removed. According to an embodiment, the sensor module 240 may detect whether an obstacle to the movement of the second housing 213 is present in a designated cycle. For example, the sensor module 240 may transmit, to the processor 250, data indicating that an obstacle to the movement of the second housing 213 has been removed, in response to an obstacle to the movement of the second housing 213 being not detected.

According to an embodiment, the processor 250 may output, to the display, the notification 401 that requests a user input for whether to change the size of the display area, in response to the obstacle to the movement of the second housing 213 being determined to have been removed.

According to an embodiment, the processor 250 may control the motor 270 so that the second housing 213 is moved in the lead-out direction, in response to the user input 901 to change the size of the display area being received. As the second housing 213 is moved, the display area may be expanded.

FIGS. 10A, 10B, 10C, 10D, 10E, and 10F are diagrams illustrating examples in which the processor 250 outputs notification that requests a user input for whether to change the size of the display area according to various embodiments.

According to various embodiments, the processor 250 may output notification that requests a user input for whether to change the size of the display area, in response to a generated event satisfying a designated condition. For example, the processor 250 may provide the notification in various ways, such as haptic, a sound, and a screen. According to an embodiment, the processor 250 may display the notification in the display area. For example, the processor 250 may display a notification message in the display area and/or may provide the notification by displaying a color and/or form of a UI for unlocking differently from a UI having a default state.

Figure 10A:
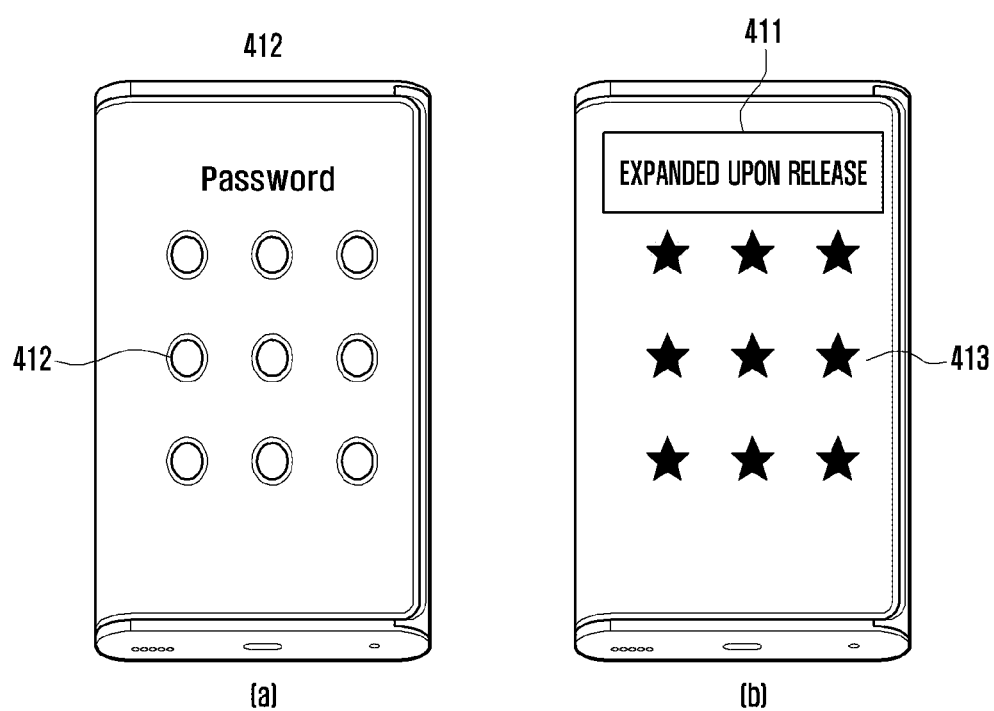
FIGS. 10A, 10B, 10C, 10D, 10E, and 10F are diagrams illustrating examples in which the processor outputs notification that requests a user input for whether to change the size of the display area according to various embodiments.

FIG. 10A illustrates an example in which notification that requests a user input for whether to change the size of the display area is output, and illustrates a UI related to an unlocking pattern. Referring to FIG. 10A, (a) and/or (b) are examples of the electronic device 200 in which the processor 250 displays a screen for receiving a pattern input from a user for the unlocking of the electronic device 200.

According to an embodiment, in the example of (a), the processor 250 may display a first pattern object 412 for receiving a first pattern, in response to being a default state. According to an embodiment, in the example of (b), the processor 250 may display a guide message 411 for whether to change the size of the display area and/or a second pattern object 413 for receiving a second pattern (e.g., operation 1300 in FIG. 3), in response to a generated event satisfying a designated condition (e.g., operation 1200—Y in FIG. 3). According to an embodiment, the second pattern object 413 in (b) may have a color and/or form different from those of the first pattern object 412 in (a). According to an embodiment, the second pattern may be the same pattern as the first pattern, and may be a pattern different from the first pattern in order to identify an input to change the size of the display area.

According to an embodiment, in the example of (b), the processor 250 may control the motor so that the second housing 213 is moved (e.g., operation 2500 in FIG. 3), in response to the input of the second pattern to the user being present in the second pattern object 413 (e.g., operation 2400—Y in FIG. 3).

Figure 10B:
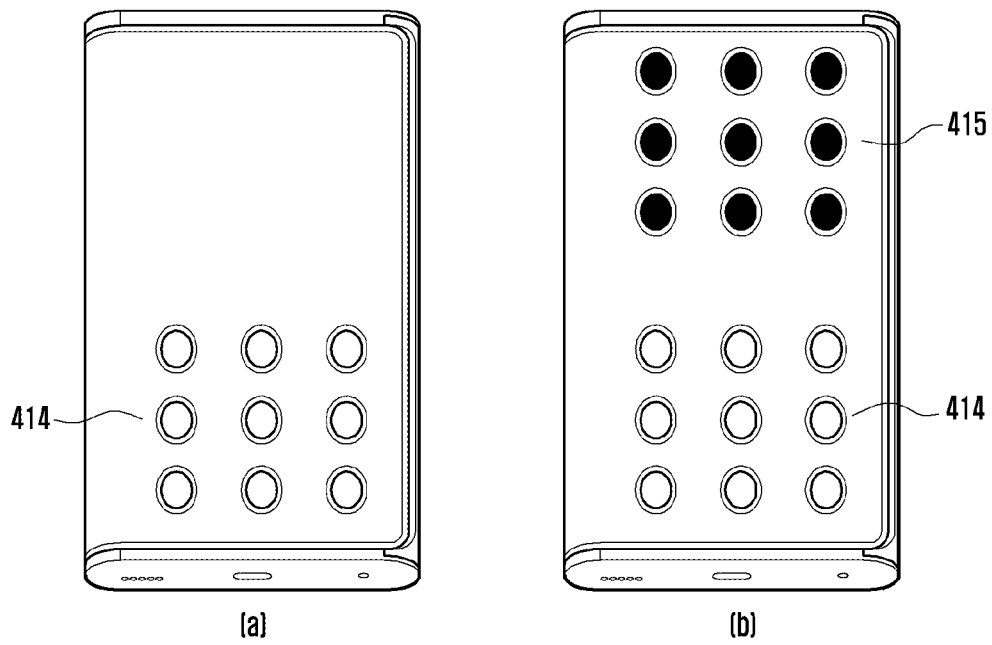

FIG. 10B illustrates an example in which notification that requests a user input for whether to change the size of the display area is output, and is a diagram illustrating the addition of an unlocking pattern UI according to various embodiments.

Referring to FIG. 10B, (a) and/or (b) are examples of the electronic device 200 in which the processor 250 displays a screen for receiving a pattern input of a user for the unlocking of the electronic device 200.

According to an embodiment, in the example of (a), the processor 250 may display the first pattern object 414 for receiving the first pattern in response to being the default state. According to an embodiment, in the example of (b), the processor 250 may display a first pattern object 414 for receiving the first pattern and a second pattern object 415 for receiving the second pattern (e.g., operation 1300 in FIG. 3), in response to a generated event satisfying a designated condition (e.g., operation 1200—Y in FIG. 3). According to an embodiment, the second pattern object 415 in (b) may have a color and/or form different from those of the first pattern object 414 in (a). According to an embodiment, the second pattern may be the same pattern as the first pattern, and may be a pattern different from the first pattern in order to identify an input to change the size of the display area.

In the example of (b), the processor 250 may control the motor so that the second housing 213 is moved (e.g., operation 2500 in FIG. 3), in response to the input of the first pattern and/or second pattern of a user to the first pattern object 414 and the second pattern object 415 being present (e.g., operation 2400—Y in FIG. 3).

Figure 10C:
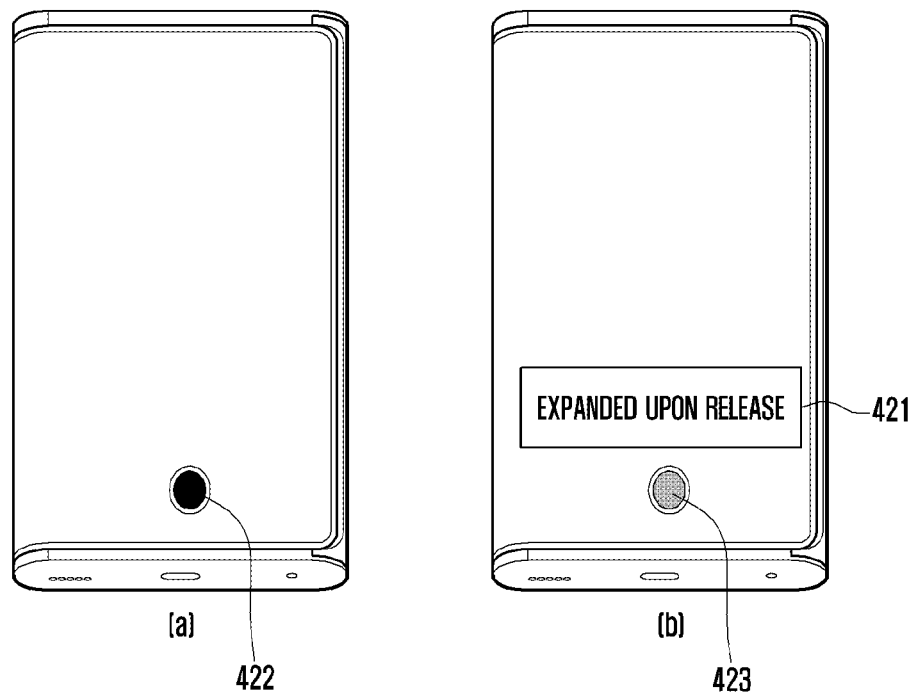

FIG. 10C illustrates an example operation of outputting notification that requests a user input for whether to change the size of the display area, and is a diagram illustrating a UI related to the recognition of a fingerprint according to various embodiments.

Referring to FIG. 10C, (a) and/or (b) are examples of the electronic device 200 in which the processor 250 displays a screen for receiving a fingerprint input of a user for the unlocking of the electronic device 200.

According to an embodiment, in the example of (a), the processor 250 may display a first indicating object 422 for providing guidance to a fingerprint input location, in response to being the default state. In the example of (b), the processor 250 may display a guide message 421 for whether to change the size of the display area and/or a second indicating object 423 for providing guidance to a fingerprint input location (e.g., operation 1300 in FIG. 3), in response to a generated event satisfying a designated condition (e.g., operation 1200—Y in FIG. 3). According to an embodiment, the second indicating object 423 in (b) may have a color and/or form different from those of the first indicating object 422 in (a).

In the example of (b), the processor 250 may control the motor so that the second housing 213 is moved (e.g., operation 2500 in FIG. 3), in response to the fingerprint input of the user to the second indicating object 423 being present (e.g., operation 2400—Y in FIG. 3).

Figure 10D:
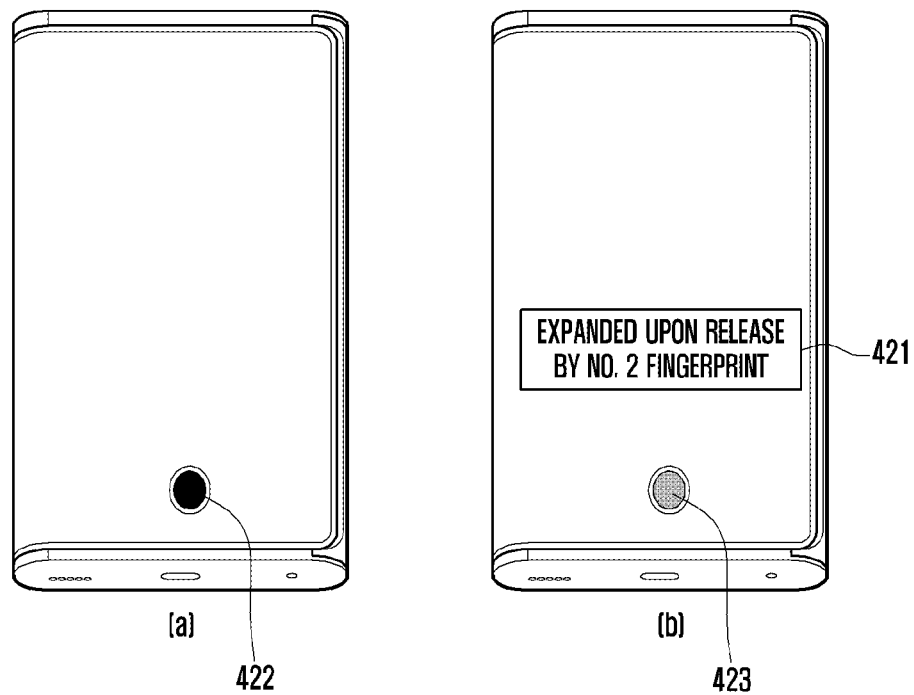

FIG. 10D illustrates an example operation of outputting notification that requests a user input for whether to change the size of the display area, and a diagram illustrating a UI related to the recognition of a fingerprint according to various embodiments.

Referring to FIG. 10D, (a) and/or (b) are examples of the electronic device 200 in which the processor 250 displays a screen for receiving the fingerprint input of a user for the unlocking of the electronic device 200.

According to an embodiment, in the example of (a), the processor 250 may display the first indicating object 422 for providing guidance to the fingerprint input location, in response to being the default state. In the example of (b), the processor 250 may display the guide message 421 including an input request for a designated fingerprint and/or the second indicating object 423 for providing guidance to the fingerprint input location (e.g., operation 1300 in FIG. 3), in order to change the size of the display area in response to a generated event satisfying the designated condition (e.g., operation 1200—Y in FIG. 3). According to an embodiment, the second indicating object 423 in (b) may have a color and/or form different from those of the first indicating object 422 in (a).

In the example of (b), the processor 250 may control the motor so that the second housing 213 is moved (e.g., operation 2500 in FIG. 3), in response to the input of the designated fingerprint to the second indicating object 423 being present (e.g., operation 2400—Y in FIG. 3).

Figure 10E:
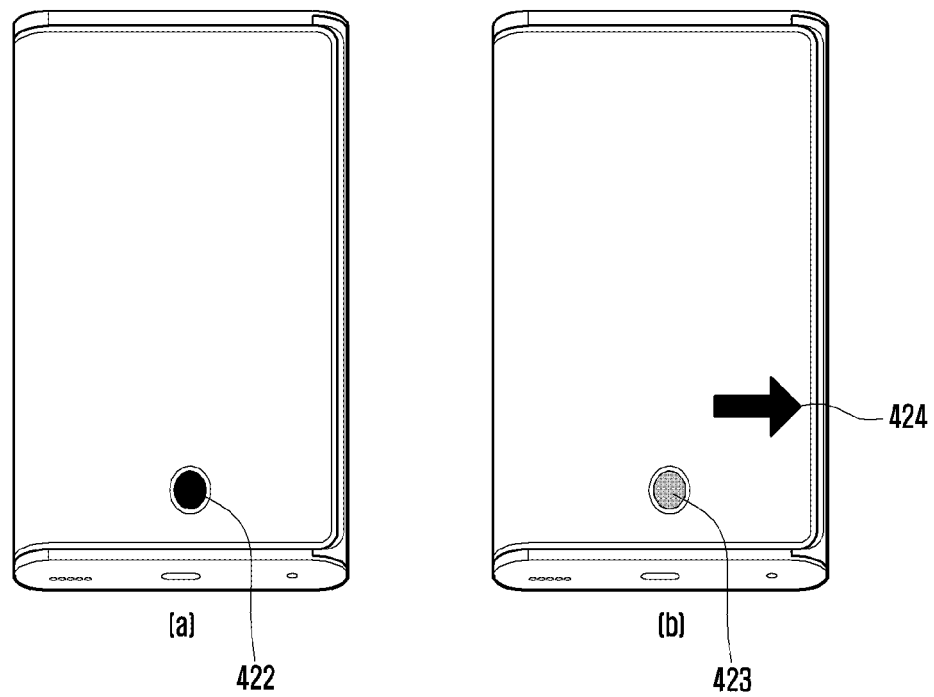

FIG. 10E illustrates an example operation of outputting notification that requests a user input for whether to change the size of the display area, and is a diagram illustrating a UI related to the recognition of a fingerprint according to various embodiments.

Referring to FIG. 10E, (a) and/or (b) are examples of the electronic device 200 in which the processor 250 displays a screen for receiving the fingerprint input of a user for the unlocking of the electronic device 200.

According to an embodiment, in the example of (a), the processor 250 may display the first indicating object 422 for providing guidance to the fingerprint input location, in response to being the default state. In the example of (b), the processor 250 may display the second indicating object 423 for providing guidance to the fingerprint input location and/or an expansion display object 424 (e.g., operation 1300 in FIG. 3), in response to a generated event satisfying a designated condition (e.g., operation 1200—Y in FIG. 3). According to an embodiment, the second indicating object 423 in (b) may have a color and/or form different from those of the first indicating object 422 in (a).

In the example of (b), the processor 250 may control the motor so that the second housing 213 is moved (e.g., operation 2500 in FIG. 3), in response to the fingerprint input of the user to the second indicating object 423 and/or a touch input to the expansion display object 424 being present (e.g., operation 2400—Y in FIG. 3).

Figure 10F:
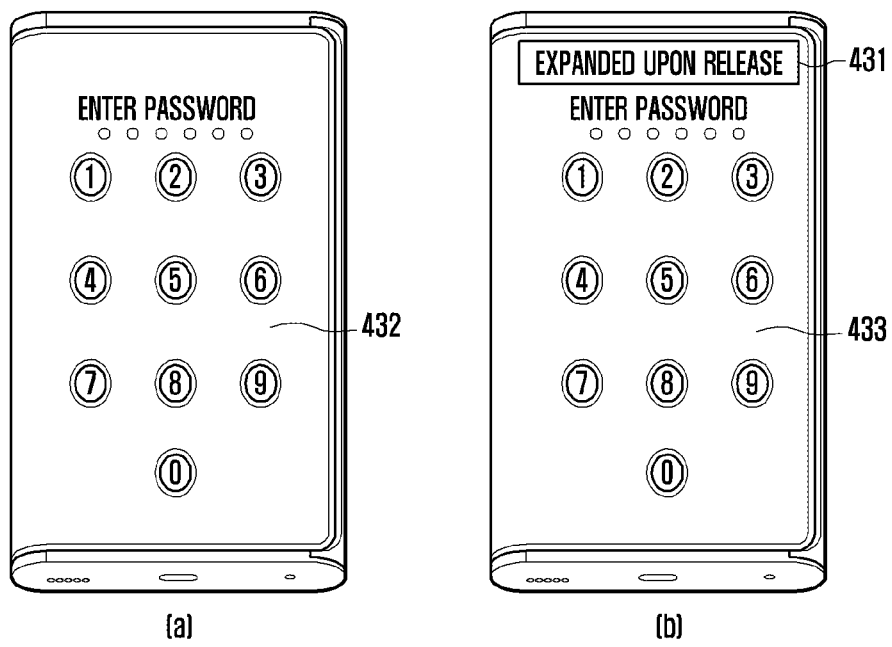

FIG. 10F illustrates an example in which notification that requests a user input for whether to change the size of the display area is output, and is a diagram illustrating a UI related to a password according to various embodiments.

Referring to FIG. 10F, (a) and/or (b) are examples of the electronic device 200 in which the processor 250 displays a screen in order to receive a password input from a user for the unlocking of the electronic device 200.

According to an embodiment, in the example of (a), the processor 250 may display a first numeric pad 432 for receiving a first password, in response to being the default state. According to an embodiment, in the example of (b), the processor 250 may display a guide message 431 for whether to change the size of the display area and a second numeric pad 433 for receiving a second password (e.g., operation 1300 in FIG. 3), in response to a generated event satisfying a designated condition (e.g., operation 1200—Y in FIG. 3). According to an embodiment, the second numeric pad 433 in (b) may have a color and/or form different from those of the first numeric pad 432 in (a). According to an embodiment, the second password may be the same number as the first password, and may be a number different from the first password in order to identify an input for changing the size of the display area.

According to an embodiment, in the example of (b), the processor 250 may control the motor so that the second housing 213 is moved (e.g., operation 2500 in FIG. 3), in response to the input of the second password from a user being present (e.g., operation 2400—Y in FIG. 3).

An electronic device according to various example embodiments of the disclosure may include: a first housing; a second housing movable with respect to the first housing; a motor configured to move the second housing to be led in and/or led out from the first housing; a display having a display area having a size changeable in response to a movement of the second housing; and a processor operatively connected to the motor and the display. The processor may be configured to: detect generation of an event related to at least one external electronic device connected to the electronic device, determine whether the event satisfies a designated condition for changing the size of the display area, and control the motor to move the second housing to change the size of the display area, in response to the event satisfying the designated condition.

In the electronic device according to various example embodiments of the disclosure, the designated condition may include a condition related to whether the external electronic device is a designated external electronic device. The processor may be configured to identify identification information of the external electronic device and to determine whether the designated condition is satisfied based on the identification.

In the electronic device according to various example embodiments of the disclosure, the designated condition may include a condition related to designated authentication information being received through the external electronic device. The processor may be configured to identify authentication information and to determine whether the designated condition is satisfied based on the identification.

In the electronic device according to various example embodiments of the disclosure, the designated condition may include a condition in which the external electronic device switches to a state in which the connection of the external electronic device with the electronic device is released. The processor may be configured to control the motor to lead the second housing in the first housing, in response to the condition being satisfied.

An electronic device according to various example embodiments of the disclosure may include: a first housing; a second housing movable with respect to the first housing; a motor configured to move the second housing to be led in and/or led out from the first housing; a display having a display area having a size which is changeable in response to a movement of the second housing; and a processor operatively connected to the motor and the display. The processor may be configured to: detect generation of an event related to a state of the electronic device, determine whether the event satisfies a designated condition for changing the size of the display area, and control the motor to move the second housing to adjust the size of the display area, in response to the event satisfying the designated condition.

In the electronic device according to various example embodiments of the disclosure, the event may include the reception of an input for authentication. The designated condition may include a condition related to whether the input is a designated input. The processor may be configured to identify the input and to determine whether the designated condition is satisfied based on the identification.

In the electronic device according to various example embodiments of the disclosure, the input may include a touch operation. The designated input may include a designated touch operation.

In the electronic device according to various example embodiments of the disclosure, the input may include a fingerprint input. The designated input may include a designated fingerprint.

In the electronic device according to various example embodiments of the disclosure, the input may include a location at which a fingerprint has been input. The designated input may include that the fingerprint is input to the designated area.

In the electronic device according to various example embodiments of the disclosure, the event may include that the electronic device is connected to a network. The designated condition may include a condition related to whether the network is a designated network. The processor may be configured to identify identification information of the network to which the electronic device has been connected and to determine whether the designated condition is satisfied based on the identification.

In the electronic device according to various example embodiments of the disclosure, the electronic device may include: a position sensor configured to measure a location of the electronic device. The event may include that the position sensor recognizes the location of the electronic device. The designated condition may include a condition related to whether the location of the electronic device is included in a designated location area. The processor may be configured to check GPS coordinates measured by the position sensor and to determine whether the designated condition is satisfied based on the check.

In the electronic device according to various example embodiments of the disclosure, the designated condition may include a condition related to whether a current time is included in a designated time zone. The processor may be configured to check a current time and to determine whether the designated condition is satisfied based on the check.

In the electronic device according to various example embodiments of the disclosure, the event may include that an application generates a message. The designated condition may include a condition related to whether the message is included in a designated message type. The processor may be configured to identify the message generated by the application and to determine whether the designated condition is satisfied based on the identification.

In the electronic device according to various example embodiments of the disclosure, the processor may be configured to output notification that requests an input for whether to change the size of the display area, in response to the event satisfying the designated condition and to control the motor so that the second housing is moved, in response to the input to change the size of the display area being received.

In the electronic device according to various example embodiments of the disclosure, the notification may be displayed on the display in the form of a pop-up window. The processor may be configured to control the motor so that the second housing is moved in response to the input for changing the size of the display area being received on the pop-up window.

In the electronic device according to various example embodiments of the disclosure, the notification may be displayed on the display in the form of a first pattern object for receiving a first pattern for an unlocking of the electronic device and/or for changing the size of the display area. The processor may be configured to control the motor so that the second housing is moved, in response to the first pattern being received on the first pattern object.

In the electronic device according to various example embodiments of the disclosure, the notification may be displayed on the display in the form of a first indicating object for receiving a first fingerprint for the unlocking of the electronic device and/or for changing the size of the display area. The processor may be configured to control the motor so that the second housing is moved, in response to the first fingerprint being received on the first indicating object.

In the electronic device according to various example embodiments of the disclosure, the notification may be displayed on the display in the form of a first numeric pad for receiving a first password for the unlocking of the electronic device and/or for changing the size of the display area. The processor may be configured to control the motor so that the second housing is moved, in response to the first password being received through the first numeric pad.

In the electronic device according to various example embodiments of the disclosure, the processor may be configured to identify attributes of the event, determine an application to be executed based on the attributes of the event, and execute the determined application.

The electronic device according to various example embodiments of the disclosure may include a sensor module including a sensor configured to detect whether an obstacle to the movement of the second housing is present. The processor may be configured to control the motor to not operate, in response to the presence of the obstacle being received from the sensor module.

It should be appreciated that various embodiments of the present disclosure and the terms used therein are not intended to limit the technological features set forth herein to particular embodiments and include various changes, equivalents, or replacements for a corresponding embodiment.

With regard to the description of the drawings, similar reference numerals may be used to refer to similar or related elements. It is to be understood that a singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
a first housing;
a second housing movable with respect to the first housing;
a motor moving the second housing into or out of the first housing;
a display comprising a display area having a size changeable in response to a movement of the second housing;
memory storing instructions; and
at least one processor, comprising processor circuitry, operatively connected to the motor and the display,
wherein the instructions, when executed by the at least one processor individually or collectively, cause the electronic device to:
detect an event generated by at least one external electronic device connected to the electronic device,
determine whether the event satisfies a designated condition,
output, based on determining that the event satisfies the designated condition, a notification that requests an input for whether to change the size of the display area, wherein the notification is in a form of a first pattern object for receiving a first pattern for changing the size of the display area, and
control the motor to move the second housing to change the size of the display area, in response to receiving the first pattern on the first pattern object.

2. The electronic device of claim 1, wherein:
the designated condition further comprises a condition related to whether the external electronic device is a designated external electronic device, and
the instructions, when executed by the at least one processor individually or collectively, cause the electronic device to:
identify identification information of the external electronic device, and
determine whether the designated condition is satisfied based on the identification.

3. The electronic device of claim 1, wherein:
the designated condition comprises a condition related to designated authentication information being received through the external electronic device, and
the instructions, when executed by the at least one processor individually or collectively, cause the electronic device to:
identify, in case that the designated condition comprises a condition related to designated authentication information being received through the external electronic device, authentication information, and
determine whether the designated condition is satisfied based on the identification.

4. The electronic device of claim 1, wherein:
the designated condition further comprises a condition in which the external electronic device switches to a state in which the connection of the external electronic device with the electronic device is released, and
the instructions, when executed by the at least one processor individually or collectively, cause the electronic device to control the motor to lead the second housing in the first housing, in response to the condition being satisfied.

5. The electronic device of claim 1,
wherein the notification comprises the form of the first pattern object for receiving the first pattern for an unlocking of the electronic device.

6. The electronic device of claim 1, further comprising a sensor module comprising a sensor detecting whether an obstacle to the movement of the second housing is present,
wherein the instructions, when executed by the at least one processor individually or collectively, cause the electronic device to control the motor to not operate, in response to the presence of the obstacle being received from the sensor module.

7. An electronic device comprising:
a first housing;
a second housing movable with respect to the first housing;
a motor moving the second housing into or out of the first housing;
a display comprising a display area having a size which is changeable in response to a movement of the second housing;
memory storing instructions; and
at least one processor comprising processor circuitry operatively connected to the motor and the display,
wherein the instructions, when executed by the at least one processor individually or collectively, cause the electronic device to:
detect generation of an event related to a state of the electronic device, determine whether the event satisfies a designated condition, output, based on determining that the event satisfies the designated condition, a notification that requests an input for whether to change the size of the display area, wherein the notification is in a form of a first pattern object for receiving a first pattern for changing the size of the display area, and control the motor to move the second housing to adjust the size of the display area, in response to receiving the first pattern on the first pattern object.

8. The electronic device of claim 7, wherein:

the event comprises receiving an input for authentication, the designated condition comprises a condition related to whether the input is a designated input, and the instructions, when executed by the at least one processor individually or collectively, cause the electronic device to:

identify, in case that the designated condition comprises a condition related to whether the input is a designated input, the input, and determine whether the designated condition is satisfied based on the identification.

9. The electronic device of claim 7, wherein:

the event comprises that the electronic device is connected to a network, the designated condition further comprises a condition related to whether the network is a designated network, and the instructions, when executed by the at least one processor individually or collectively, cause the electronic device to:

identify identification information of the network to which the electronic device has been connected, and determine whether the designated condition is satisfied based on the identification.

10. The electronic device of claim 7, wherein:

a position sensor measuring a location of the electronic device, the event further comprises the position sensor recognizing the location of the electronic device, the designated condition further comprises a condition related to whether the location of the electronic device is included in a designated location area, and the instructions, when executed by the at least one processor individually or collectively, cause the electronic device to:

detect global position system (GPS) coordinates measured by the position sensor, and determine whether the designated condition is satisfied based on the detected GPS coordinates.

11. The electronic device of claim 7, wherein:

the designated condition further comprises a condition related to whether a current time is included in a designated time zone, and the instructions, when executed by the at least one processor individually or collectively, cause the electronic device to:

detect a current time, and determine whether the designated condition is satisfied based on the detected current time.

12. The electronic device of claim 7, wherein:

the event further comprises that an application generates a message, the designated condition further comprises a condition related to whether the message is included in a designated message type, and the instructions, when executed by the at least one processor individually or collectively, cause the electronic device to:

identify the message generated by the application, and determine whether the designated condition is satisfied based on the identification.

13. The electronic device of claim 7, wherein the instructions, when executed by the at least one processor individually or collectively, cause the electronic device to:

identify attributes of the event, determine an application to be executed based on the attributes of the event, and execute the determined application.

* * * * *